(12) United States Patent
Takada et al.

(10) Patent No.: US 6,191,061 B1
(45) Date of Patent: Feb. 20, 2001

(54) METHOD OF PURIFYING EXHAUST GAS AND CATALYST FOR PURIFYING EXHAUST GAS

(75) Inventors: Toshihiro Takada; Hiroaki Takahashi, both of Toyota; Masaru Ishii, Anjo; Saeko Kurachi, Toyota, all of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/402,492

(22) PCT Filed: Apr. 22, 1998

(86) PCT No.: PCT/JP98/01859

§ 371 Date: Dec. 29, 1999

§ 102(e) Date: Dec. 29, 1999

(87) PCT Pub. No.: WO98/47605

PCT Pub. Date: Oct. 29, 1998

(30) Foreign Application Priority Data

| Apr. 23, 1997 | (JP) | 9-106209 |
| May 12, 1997 | (JP) | 9-120681 |
| May 12, 1997 | (JP) | 9-120688 |
| Aug. 21, 1997 | (JP) | 9-225218 |
| Aug. 21, 1997 | (JP) | 9-225224 |
| Aug. 21, 1997 | (JP) | 9-225229 |

(51) Int. Cl.[7] .................................. B01J 29/06
(52) U.S. Cl. ................ 502/66; 502/64; 502/67; 502/71; 502/74; 502/77; 502/79
(58) Field of Search .............. 423/213.2, 213.5, 423/239.1, 239.2; 502/64, 66, 67, 74, 77, 71, 79

(56) References Cited

U.S. PATENT DOCUMENTS

| 5,078,979 | * | 1/1992 | Dunne | 423/212 |
| 5,189,876 | | 3/1993 | Hirota et al. | |
| 5,336,476 | * | 8/1994 | Kintaichi et al. | 423/239.1 |
| 5,587,137 | * | 12/1996 | Swaroop et al. | 423/239.2 |
| 5,676,912 | * | 10/1997 | Sharma et al. | 423/213.2 |
| 5,772,972 | * | 6/1998 | Hepburn et al. | 423/213.5 |
| 5,804,155 | * | 9/1998 | Farrauto et al. | 423/239.2 |
| 5,849,255 | * | 12/1998 | Sawyer et al. | 423/213.5 |
| 5,888,464 | * | 3/1999 | Wu et al. | 423/213.5 |
| 5,922,295 | * | 7/1999 | Chattha et al. | 423/213.7 |
| 5,928,981 | * | 7/1999 | Leyrer et al. | 502/64 |
| 5,948,377 | * | 9/1999 | Sung | 423/213.5 |
| 6,001,320 | * | 12/1999 | Addiego | 423/239.2 |
| 6,047,544 | * | 4/2000 | Yamamoto et al. | 60/285 |

FOREIGN PATENT DOCUMENTS

| 0 499 931 A1 | 8/1992 | (EP) . |
| 61-103546 | 5/1986 | (JP) . |
| 2-135126 | 5/1990 | (JP) . |
| 3-89942 | 4/1991 | (JP) . |
| 3-193139 | 8/1991 | (JP) . |
| 3-232533 | 10/1991 | (JP) . |
| 4-1617 U | 1/1992 | (JP) . |
| 4-118030 | 4/1992 | (JP) . |
| 4-210241 | 7/1992 | (JP) . |
| 5-293380 | 11/1993 | (JP) . |
| 6-165918 | 6/1994 | (JP) . |
| 6-226107 | 8/1994 | (JP) . |
| 6-142520 | 5/1995 | (JP) . |
| 7-174017 | 7/1995 | (JP) . |
| 7-213911 | 8/1995 | (JP) . |
| 7-332073 | 12/1995 | (JP) . |
| 8-010566 | 1/1996 | (JP) . |
| 8-71424 | 3/1996 | (JP) . |
| 8-150335 | 11/1996 | (JP) . |
| 9-201533 | 8/1997 | (JP) . |
| 94/11623 | * 5/1994 | (WO) . |
| WO 94/25143 | 11/1994 | (WO) . |

* cited by examiner

*Primary Examiner*—Tom Dunn
(74) *Attorney, Agent, or Firm*—Oliff & Berridge, PLC

(57) ABSTRACT

In an exhaust gas in an oxygen-rich atmosphere, a method of purifying an exhaust gas and a catalyst for purifying an exhaust gas, which can exhibit a high $NO_x$ conversion securely, are provided. Disclosed is a method of purifying an exhaust gas that reduces and purifies $NO_x$ in an exhaust gas in an oxygen-rich atmosphere. Here, as a catalyst for purifying an exhaust gas, a loading layer comprising zeolite is loaded with alumina sulfate and cerium sulfate-zirconium composite oxide, and Pt is loaded on these. And, in a temperature range where HC are not oxidized, the HC are adsorbed and held by the zeolite, the HC, which the zeolite releases at the temperature increment, are subjected to cracking by the zeolite, the alumina sulfate and the cerium sulfate-zirconium composite oxide, and the thus produced low-grade HC are turned into reducing agents, thereby reducing and purifying the $NO_x$ in the exhaust gas.

13 Claims, 11 Drawing Sheets

METHOD OF PURIFYING EXHAUST GAS AND CATALYST FOR PURIFYING EXHAUST GAS

TECHNICAL FIELD

The present invention, relates to a method of purifying an exhaust gas and a catalyst for purifying an exhaust gas. When oxygen is contained in an exhaust gas in an excessive amount more than required for oxidizing carbon monoxide (CO) and hydrocarbons (HC) contained in the exhaust gas, this method and catalyst are appropriate for purifying nitrogen oxides ($NO_x$) in the exhaust gas.

BACKGROUND ART

As an automobile catalyst for purifying an exhaust gas, a 3-way catalyst is employed which carries out the oxidation of CO and HC and the reduction of $NO_x$ simultaneously to purify an exhaust gas. With regard to such a catalyst, a catalyst has been known widely in which a porous loading layer comprising γ-alumina is formed on a heat-resistant support substrate, such as cordierite, and a noble metal, such as Pt, Pd and Rh, is loaded on this loading layer.

By the way, the purifying performance of such a catalyst for purifying an exhaust gas depends greatly on the air-fuel ratio (A/F) of an engine. For example, when the air-fuel ratio is large, namely on a lean side where the fuel concentration is lean, the oxygen amount in the exhaust gas increases so that the oxidation reactions of purifying CO and HC are active, on the other hand, the reduction reactions of purrying $NO_x$ are inactive. Conversely, for example, when the air-fuel ratio is small, namely on a rich side where the fuel concentration is high, the oxygen amount in the exhaust gas decreases so that the oxidation reactions are inactive and the reduction reactions are active.

Whilst, in automobile driving, in the case of urban driving, the acceleration and deceleration are carried out frequently so that the air-fuel ratio varies frequently within the range of from adjacent to the stoichiometric point (ideal air-fuel ratio) to the rich state. In order to cope with the low fuel consumption requirement in such driving, a lean-burn control is needed in which a mixture containing oxygen as excessive as possible is supplied. However, the oxygen amount is large in an exhaust gas emitted from a lean-burn engine, and accordingly the reduction reactions of purifying $NO_x$ are inactive. Therefore, it is desired to develop a catalyst for purifying an exhaust gas which can fully purify $NO_x$ in the exhaust gas which is emitted from the lean-burn engine and contains oxygen in a large amount.

For this reason, a catalyst for purifying an exhaust gas has been proposed conventionally in which a zeolite, such as mordenite, having an HC adsorbing ability is employed as a catalyst loading layer (for example, Japanese Unexamined Patent Publication (KOKAI) No. 4-118,030). In this catalyst for purifying an exhaust gas, HC are adsorbed while the temperature of the exhaust gas is low, the adsorbed HC are released by increasing the temperature of the exhaust gas, thus the $NO_x$ in the exhaust gas are reduced, and accordingly the $NO_x$ conversion can be improved.

Moreover, since the zeolite has many acidic sites and are acidic, it is good in terms of the HC adsorbing ability and adsorbs HC in the exhaust gas. Therefore, even in an exhaust gas of oxygen-rich atmosphere, the atmosphere adjacent to the catalyst is from the stoichiometric point to a rich atmosphere where the HC are present in large amounts, the $NO_x$ are reacted with the adsorbed HC by the catalytic action of a loaded noble metal, and thereby they are reduced and purified.

A method of purifying an exhaust gas is proposed in which a specific catalyst is provided and liquefied HC whose number of carbon atoms is 5 or more are added on an upstream side with respect to it (Japanese Unexamined Patent Publication (KOKAI) No. 6-165,918). In this method, while the downstream-side catalyst is in a low activated state, HC are supplied from the upstream side, the $NO_x$ are reduced by these HC, and the improvement of the $NO_x$ conversion is intended. Here, since the HC whose number of carbon atoms is 5 or more, namely the high-grade HC, are gradually subjected to cracking by heat in the exhaust gas, when the downstream-side catalyst is put into an activated state at a temperature of from 300 to 500° C., they are turned into low-grade HC whose number of carbon atoms is less than 5 by cracking, and thus it is considered that the $NO_x$ can be reduced securely.

Therefore, the present inventors considered as follows. In a method of purifying an exhaust gas in which mordenite having an HC adsorbing ability, namely, a porous oxide being a zeolite in a wide sense, is employed as a support, and in which HC are supplied, and in a catalyst having the arrangement, the 3-way purifying performance can be further improved.

However, the following are revealed. The low-grade HC are better than the high-grade HC in terms of the $NO_x$ reducing force as aforementioned, but they were inferior thereto in terms of the adsorbing force to the noble metal in the catalyst. Namely, the low-grade HC are less likely to adsorb onto the noble metal in the activated downstream-side catalyst.

Therefore, in the case where the HC are supplied from the upstream side, even if they are high-grade, they are eventually subjected to cracking by heat on the downstream side by 10 cm from the upstream-side of the catalyst, and they are turned into low-grade HC, CO or $CO_2$, since the low-grade HC are less likely to adsorb onto the noble metal in the activated downstream-side catalyst, they do not react with the $NO_x$ and are likely to be emitted as they are. Hence, as a result, it is less likely to acquire the expected improvement of the $NO_x$ conversion.

Therefore, it is an object of the present invention to provide a method of purifying an exhaust gas and a catalyst for purifying an exhaust gas which can exhibit a high $NO_x$ conversion even in an exhaust gas in an oxygen-rich atmosphere.

By the way, when a catalyst exhibits a purifying ability, a temperature of 300° C. or more is needed in general. However, immediately after driving is started, since the temperature of an exhaust gas flowing in the catalyst is low, the inherent purifying ability of the catalyst is not exhibited, and accordingly there arises a problem in that the HC and $NO_x$ are emitted as they are substantially.

Hence, in Japanese Patent Application No. 6-524,106, an international patent application, a purifying apparatus is disclosed in which a 3-way catalyst or an oxidizing catalyst is disposed on an upstream side of an exhaust gas flow, subsequently an $NO_x$ removing catalyst is disposed, and furthermore a 3-way catalyst or an oxidizing catalyst is disposed on a downstream side.

According to this purifying apparatus, since the exhaust gas, which is heated by the reaction heat in the upstream-side 3-way catalyst or oxidizing catalyst and whose temperature is increased, is flowed into the $NO_x$ removing catalyst, it is possible to reduce and remove the $NO_x$ even in such a case as immediately after driving is started where the exhaust gas temperature is low.

In Japanese Unexamined Patent Publication (KOKAI) No. 2-135,126, there is disclosed an exhaust gas purifying apparatus in which an adsorbing catalyst adapted for adsorbing HC and having a zeolite and a noble metal is disposed on an upstream side of an exhaust gas flow, and a 3-way catalyst is disposed on a downstream side.

According to this exhaust gas purifying apparatus, the HC are adsorbed on the adsorbing catalyst when the exhaust gas temperature is low, the HC are removed from the adsorbing catalyst as the temperature of the flowing-in exhaust gas increases. Then, the HC flowed to the downstream side reduce the $NO_x$ on the downstream-side 3-way catalyst. Accordingly, it is possible to reduce the emission of the HC even in such a case as immediately after driving is started where the exhaust gas temperature is low, and the $NO_x$ purifying performance is improved.

Moreover, in Japanese Unexamined Patent Publication (KOKAI) No. 7-174,017, there is disclosed a catalytic apparatus in which a 3-way catalyst is disposed on an upstream side of an exhaust gas flow, and an adsorbing catalyst adapted for adsorbing HC and having a zeolite and a noble metal is disposed on a downstream side.

According to this catalytic apparatus, the HC are adsorbed on the adsorbing catalyst when the exhaust gas temperature is low, the HC are removed from the adsorbing catalyst as the temperature of the exhaust gas flowing into the adsorbing catalyst increases, but the HC are oxidized and removed on the adsorbing catalyst when the temperature is the activation temperature of the noble metal or more. Accordingly, it is possible to reduce the emission of the HC even in such a case as immediately after driving is started where the exhaust gas temperature is low.

However, in the purifying apparatus disclosed in Japanese Patent Application No. 6-524,106, there are drawbacks in that it takes long for the temperature of the exhaust gas flowing into the $NO_x$ removing catalyst to increase to the activation temperature or more of the $NO_x$ removing catalyst, and in that the purifying performances of the HC and $NO_x$ are not sufficient when the exhaust gas temperature is low.

In the purifying apparatus disclosed in Japanese Unexamined Patent Publication (KOKAI) No. 7-174,017, the upstream-side 3-way catalyst is cooled by the exhaust gas, for example, at the time of deceleration, but there arises a case where the purification of the HC is made difficult by cooling the downstream-side adsorbing catalyst as well.

In addition, in the aforementioned catalysts, the $NO_x$ purifying performance is not satisfactory when the exhaust gas is such an exhaust gas as emitted from a diesel engine and containing SOF (Soluble Organic Fraction) in a large amount in the HC. The reason for this is described as follows.

Among the HC adsorbed on the adsorbing material, the relatively high molecular-weight HC, such as the SOF, have a property that they are less likely to be eliminated at a low-temperature range. Accordingly, in the low-temperature range, the HC are less likely to flow to the downstream side, the efficiency of the reduction reactions of the $NO_x$ is low when the exhaust gas containing SOF in a large amount is purified. When the SOF adsorbs onto the zeolite, since the SOF is less likely to be eliminated, the active sites of the noble metal are covered therewith so that there occurs a poisoning in which oxygen-deficiency state arises. When such a poisoning occurs, the activity of the noble metal is lost so that the purifying ability decreases.

Therefore, it is an object of the present invention to provide a method of purifying an exhaust gas and a catalyst for purifying an exhaust gas which can furthermore efficiently remove the HC and $NO_x$ even in such a case as immediately after driving is started or at the deceleration where the exhaust gas temperature is low.

Moreover, it is another object of the present invention to provide a method of purifying an exhaust gas and a catalyst for purifying an exhaust gas which can furthermore efficiently remove the $NO_x$ even in an exhaust gas containing SOF in a large amount.

A. zeolite exhibits a cracking action, and a zeolite, such as mordenite, ZSM-5 and super-stable type Y zeolite (US-Y), exhibits an especially high cracking action. Accordingly, by employing these zeolites as a catalyst support, the SOF in the diesel exhaust gas is subjected to cracking, and it is turned into low-molecular weight HC which are likely to react, and thereby it is possible to furthermore efficiently reduce and purify the $NO_x$.

A zeolite is tectoaluminosilicate chemically, and zeolites have been known which have a variety of Si/Al ratios. It has been revealed that, depending on this Si/Al ratio, the catalytic properties of a zeolite vary greatly.

Since a zeolite of a small Si/Al ratio has many acidic sites, and exhibits a high cracking ability and a high HC adsorbing ability, it is good in terms of the $NO_x$ purifying ability. However, in a zeolite having a small Si/Al ratio and many acidic sites, the HC adsorbed in the pores are carbonized to be easily subjected to caulking, and enclose within the pores, as a result, there arises a drawback in that the HC adsorbing ability decreases chronologically.

Moreover, in a zeolite having a small Si/Al ratio and many acidic sites, the acidic sites are easily lost by the elimination of Al (tetra-coordination in the zeolite structure is turned into hexa-coordination) when it is subjected to a hydrothermal durability treatment, and there arises a drawback in that the cracking ability decreases. In addition, in a catalyst in which a noble metal is loaded on such a zeolite, the noble metal is grown granularly by the elimination of Al resulting from the hydrothermal durability treatment, and there arises a drawback in that the activity decreases.

On the other hand, a zeolite having a large Si/Al ratio has a small amount of acidic sites, and accordingly exhibits a low cracking ability. However, since no caulking occurs, the chronological decrement of the HC adsorbing ability does not occur, and since the granular growth of the noble metal resulting from the elimination of Al is suppressed, there arises an advantage in that it is good in terms of the durability.

Therefore, it is an object of the present invention to provide a method of purifying an exhaust gas and a catalyst for purifying an exhaust gas which can furthermore efficiently remove the $NO_x$ by employing a zeolite having a large Si/Al ratio to suppress the decrement of the HC adsorbing ability and by securing a high cracking ability equivalent to that of a zeolite having a small Si/Al ratio.

DISCLOSURE OF INVENTION

Hence, in the present invention, a catalyst for purifying an exhaust gas is used, the catalyst provided with a support which contains an HC adsorbing material including a zeolite selected from the group consisting of mordenite, ZSM-5 and type Y zeolite and having a hydrocarbon adsorbing ability, and a noble metal and a solid strong acid which are loaded on the support; HC are adsorbed and held by the HC adsorbing material; the HC which are released from the HC adsorbing material are subjected to cracking by the solid strong acid; and the thus produced HC are turned into reducing agents, thereby reducing and purifying the nitrogen oxides in the exhaust gas.

Moreover, the catalyst used by the aforementioned purifying method is characterized in that it is provided with a support which contains an HC adsorbing material including a zeolite selected from the group consisting of mordenite, ZSM-5 and type Y zeolite, and a noble metal and a solid strong acid which are loaded on the support. Hereinafter, this catalyst is referred to as a "first catalyst".

Namely, in the present purifying method, the HC are subjected to cracking by the dehydrogenation reaction by the solid strong acid loaded on the support of the first catalyst, and thereby low-grade HC are generated which exhibit high reactivities with the $NO_x$. And, the low-grade HC securely react with the $NO_x$, and accordingly high improvement of $NO_x$ conversion is obtained.

On this occasion, since the cracking of the HC occurs in the catalyst, even the low-grade HC, which are less likely to adsorb onto the noble metal if they are subjected to cracking on an upstream side with respect to the catalyst, are likely to adsorb onto the noble metal in the present invention. Furthermore, since the HC in the exhaust gas or the supplied HC are adsorbed and held by the HC adsorbing material, the residing time of the HC is prolonged in the catalyst so that the cracking by the solid strong acid as well as the reactivities of the low-grade HC with the $NO_x$ are improved.

Moreover, since the adsorbing of the HC by the HC adsorbing material is carried out in a temperature region where the HC are not oxidized, the emission of the HC at a low-temperature region is suppressed, and, in a high-temperature region resulting from the temperature increment, the HC are released from the HC adsorbing material, and they are utilized in the cracking of the HC by the solid strong acid as well as in the reaction between the low-grade HC and the $NO_x$.

Therefore, in accordance with the present purifying method, it is possible to exhibit a securely high $NO_x$ conversion even in an exhaust gas in an oxygen-rich atmosphere.

In the first catalyst, it is possible to employ a heat-resistant honeycomb body comprising cordierite, etc., as a substrate. In this case, a loading layer can be formed by including the HC adsorbing material in the honeycomb body, and the noble metal can be further loaded on the loading layer. Moreover, the aforementioned HC adsorbing material itself can be formed as a honeycomb shape or a pellet shape, and the noble metal can be loaded on this.

As for the support, it is possible to use alumina, silica, zirconia, titania, silica-alumina, etc. In this support, the HC adsorbing material is included, but the support can be constituted by the HC adsorbing material only.

As for the HC adsorbing material, it is possible to employ a zeolite selected from the group consisting of mordenite, ZSM-5 and type Y zeolite.

When the other support is used combinedly with a zeolite, it is preferred that the content of the zeolite is 20% by weight or more. When the content of the zeolite is less than 20% by weight, the HC adsorbing ability is decreased, and the operation of the present invention is less likely to be effected.

The noble metal is gold, silver and the platinum group (Ru, Rh, Pd, Os, Ir, Pt). As for a practical noble metal, it is possible to employ one or more of Pt, Rh and Pd. It is appropriate that the loading amount of the noble meal in the entire catalyst falls in the range of from 0.5 to 10 g with respect to 1 liter of the support. When the loading amount is smaller than this range, the activity is hardly obtained, when the noble metal is loaded more than this range, the activity saturates and the cost goes up.

As for the solid strong acid (solid strong asid, strongly acidic substance), a solidified acid can be employed which is made by treating an oxide, such as zirconia, alumina and titania, with a strong acid, such as sulfuric acid, tungstic acid and molybdic acid, so that the strong acid is adhered onto the oxide. This solid strong acid can preferably be loaded on the support by adsorbing an aqueous solution of a water-soluble metallic salt into the aforementioned support, thereafter by alkalifying the water-soluble metallic salt so that a metallic hydroxide is exposed on the support, and thereafter by acidifying the metallic hydroxide. By thusly doing, since the solid strong acid can be chemically loaded on the support, the fine solid strong acid can be diffused evenly around the pores of the HC adsorbing material. Hence, the HC securely contact with the solid strong acid, and are likely to be subjected to cracking.

As the solid strong acid, it is furthermore preferable to employ a cerium sulfate-zirconium composite oxide. The cerium sulfate-zirconium composite oxide can be cerium sulfate-Zr-Y composite oxide, cerium sulfate-Zr-Ca composite oxide, etc. The ceria-based oxide has an oxygen storage ability by which oxygen is released at the time of a rich atmosphere and oxygen is stored at the time of a lean atmosphere. The ceria-based solid strong acid is a ceria-based oxide which is made into an acidic support, and has an oxygen storage ability as well. Accordingly, in the first catalyst which employs the cerium sulfate-zirconium composite oxide as the solid strong acid, the oxygen, which is released from the ceria-based solid strong acid, oxidizes NO in the exhaust gas to $NO_2$ and makes it likely to adsorb onto the noble metal of the catalyst. Consequently, the $NO_x$ are concentrated on the noble metal, and are reduced and purified efficiently by the low-grade HC which have been subjected to cracking.

Moreover, in the exhaust gas, $SO_2$ is contained which is generated by burning sulfur (S) contained in the fuel, it is further oxidized by the noble metal to $SO_3$ in an oxygen-rich atmosphere. Namely, in the exhaust gas, these sulfates are also contained. Accordingly, in a catalyst including a ceria-based oxide, the sulfates are likely to adsorb onto the ceria-based oxide, and there arises a drawback in that the oxygen storage ability decreases. However, in the catalyst employing the cerium sulfate-zirconium composite oxide as the solid strong acid, since the cerium sulfate-zirconium composite oxide is acidic, it is less likely to adsorb the sulfates, and thus the oxygen storage ability of the cerium sulfate-zirconium composite oxide is not reduced.

In the aforementioned first catalyst, the support can desirably contain a zeolite; and loading amounts of the noble metal of an upstream portion disposed on an upstream side of an exhaust gas flow and of a downstream portion disposed on an downstream side can desirably be greater than a loading amount of an intermediate portion between the upstream portion and the downstream portion. Hereinafter, the catalyst of this arrangement will be referred to as a "second catalyst".

At the time of acceleration from starting driving, the upstream side of the second catalyst is first heated, thereafter, heat is transferred to the downstream side. Therefore, by increasing the noble metal loading amount of the upstream side, when the exhaust gas temperature reaches the oxidation reaction temperature of the HC, the oxidation reactions of the HC are started (ignited) at the upstream portion, the reactions develop abruptly, the reactions are transferred to the downstream side, and the reaction heat is also transferred to the downstream side. Therefore, the time required for the entire second catalyst to reach the reaction temperature is reduced with respect to the conventional ones, and the HC are efficiently oxidized and removed. Moreover, when the HC, which are stored in the zeolite, are eliminated, since the atmosphere on the downstream side becomes a highly reducing atmosphere, the $NO_x$ in the exhaust gas are efficiently reduced and removed.

On the other hand, at the time of deceleration, the upstream portion is cooled by the exhaust gas, but, by loading the noble metal on the downstream portion as well in a greater amount, the reactions at the downstream portion are active so that the high-temperature state is maintained. And, since the reactions at the downstream portion are transferred to the upstream side, at the time of deceleration as well, the oxidation reactions of the HC and the reduction reactions of the $NO_x$ develop in the entire catalyst.

In the second catalyst, the loading amount of the entire noble metal can appropriately fall in the range of from 0.5 to 10 g with respect to 1 liter of the support. When it is less than this range, the activity is hardly obtained, when the noble metal is loaded more than this range, the activity saturates and the cost goes up.

The loading amounts of the noble metal of the upstream portion and the downstream portion are not limited in particular as far as they fall in the aforementioned range as a whole, and they are greater than that of the intermediate portion. Note that the loading amount of the noble metal of the intermediate portion can desirably fall in the range of from 0.1 to 5 g with respect to 1 liter of the support. When the loading amount of the noble metal of the intermediate portion is less than the range, the reactions at the intermediate portion are not expected so that the purifying performance decreases. When the loading amount of the noble metal of the intermediate portion is more than the range, since the difference between it and the loading amounts of the upstream portion and the downstream portion is so small that the HC adsorbing amount of the zeolite decreases in the intermediate portion, the aforementioned operation of the present invention are not effected.

The upstream portion and the downstream portion can desirably fall in the range of from 5 to 30% by volume, respectively, of the entire second catalyst. When the volumes of the upstream portion and the downstream portion are less than this range, the aforementioned operation is not effected, when they are more than this range, the adsorbing amount of the HC are so small that the aforementioned operation is not effected.

Moreover, in the second catalyst, at least the upstream portion of either one of the upstream portion and the downstream portion can desirably contain the solid strong acid.

The solid strong acid has an ability of cracking the HC. Therefore, since the SOF, which is adsorbed onto the zeolite, is subjected to cracking and turned into the low-molecular weight HC by the solid strong acid, it is easily eliminated from the zeolite, and thus it is easily oxidized and reduced and it is consumed to reduce the $NO_x$.

Therefore, in the second catalyst, when it is constituted so as to contain the solid strong acid in the upstream portion, since the aforementioned operation is effected at the upstream portion, the oxidation reactions of the HC develop furthermore abruptly, the reactions propagate to the downstream side, and the reaction heat also propagates to the downstream side. Therefore, the time required for the entire exhaust gas purifying catalyst to reach the reaction temperature is furthermore reduced, and the HC and the $NO_x$ are removed furthermore efficiently.

Moreover, when it is constituted so as to contain the solid strong acid also in the downstream portion, the reactions are furthermore active in the downstream portion during deceleration, the oxidation reactions of the HC and the reduction reactions of the $NO_x$ develop furthermore actively in the entire catalyst during deceleration.

Concerning the content of the solid strong acid contained at least in the upstream portion, when it is contained in a small amount, the operation is effected in its own way. However, when it is contained in an amount of 95 g or more with respect to 1 liter of the support, the effect saturates and the amount of the support reduces relatively so that the HC adsorbing amount decreases, and there arises a drawback in that the purifying activity decreases, and so on.

Note that the HC are adsorbed on the zeolite, but the relatively high molecular-weight HC, such as the SOF, are less likely to be eliminated therefrom in a low temperature range. The active sites of the noble metal are covered with the HC so that there arises an oxygen deficiency state. Thus, a poisoning occurs in which the activity degrades.

Hence, when cerium oxide is contained at least in the upstream portion among the upstream portion and the downstream portion, since oxygen is supplied by the oxygen storage-and-release ability of the cerium oxide even in a rich atmosphere, the HC can be oxidized and removed before the poisoning of the active sites occurs, and the poisoning can be suppressed.

Concerning the content of the cerium oxide contained at least in the upstream portion, when it is contained in a small amount, the operation is effected in its own way. However, when it is contained in an amount of 85 g or more with respect to 1 liter of the support, the amount of the support reduces relatively so that the HC adsorbing amount decreases, and there arises a drawback in that the purifying activity decreases, and so on. Note that the cerium oxide can desirably be made into a composite oxide together with zirconium oxide and be included as a stabilized one.

When manufacturing the second catalyst, it can be constituted by forming each of the upstream portion, the intermediate portion and the downstream portion separately, by lining each of them in this order, and by disposing each of them in an exhaust gas flow passage. Moreover, into a support powder containing the zeolite, solutions of the noble metal having different concentrations but the same amount can be impregnated or a solution thereof having the same concentration but different amounts can be impregnated and evaporated to dry, and, by using the respective powders with the noble metal loaded, the upstream portion, the intermediate portion and the downstream portion can be formed. Alternatively, by applying a masking to a honeycomb support, each of the upstream portion, the intermediate portion and the downstream portion can be immersed into solutions of the noble metal having different concentrations, and thereby the noble metal can be loaded.

In the aforementioned first catalyst, the support can desirably contain a zeolite; and a strong acid can desirably be contained in an upstream portion disposed on an upstream side of the exhaust gas flow. Hereinafter, the catalyst of this arrangement will be referred to as a "third catalyst".

The solid strong acid can desirably be contained only in the upstream portion of the third catalyst. With this arrangement, since the SOF adsorbed onto the zeolite is subjected to cracking and is turned into low-molecular weight HC by the strong acid, it is easily eliminated from the zeolite, is flowed to the downstream side, and is consumed to purify the $NO_x$. Therefore, the $NO_x$ purifying performance is improved. Moreover, since the poisoning is suppressed in which the catalytic active sites are covered with the adsorbed HC so that there arises an oxygen deficiency state, the purifying performances of the HC and the $NO_x$ at the upstream portion are inhibited from degrading.

When the solid strong acid is contained in the downstream side as well, since the zeolite is acidified, the $NO_x$ are inhibited from adsorbing onto the catalytic active sites, and the $NO_x$ purifying performance degrades. Therefore, it is desired that the solid strong acid is contained only in the upstream portion.

In order to efficiently occur the reduction reactions of the $NO_x$, it is desired that the $NO_x$ are adsorbed onto the catalytic active sites. However, depending on the types of the $NO_x$, $NO_x$ exhibit different adsorbabilities onto the catalytic active sites, for example, there is a difference in that NO is less likely to adsorb but $NO_2$ is likely to adsorb. Therefore, in order to adsorb the $NO_x$ onto the catalytic active sites, it is desired that NO in the exhaust gas is oxidized and turned into $NO_2$ by the catalyst.

However, when the HC and the NO coexist, even if the NO is oxidized to $NO_2$, since the $NO_2$ is partly reduced back to NO, the amount of the $NO_x$ adsorbed onto the catalytic active sites is reduced so that there arises a drawback in that the reduction of the $NO_x$ is not carried out efficiently.

Hence, in the third catalyst, it is desired that the content of the zeolite is increased more in the upstream portion than in the downstream portion. By thusly constituting, HC is adsorbed mostly by the upstream portion, the coexisting state of the HC and the NO is canceled in the downstream portion. Therefore, since the NO is efficiently oxidized to $NO_2$ in the downstream portion, the amount of the $NO_x$ adsorbed onto the catalytic active sites increases in the downstream portion. Moreover, in the upstream portion, the SOF is subjected to cracking by the solid strong acid, thereby generating a large amount of the low-molecular weight HC. These two operations are combined so that the $NO_x$ are reduced and removed efficiently.

Moreover, in the third catalyst, it is desired that the loading amount of the noble metal of the upstream portion is less than the loading amount of the noble metal of the downstream portion. With this arrangement, since the oxidation reactions of the HC in the upstream portion are suppressed, the adsorbing amount of the HC is increased in the upstream portion, since the heat generation resulting from the oxidation reactions is reduced, the adsorption efficiency is also improved. Therefore, in the upstream portion, the low-molecular weight HC are generated in a large amount by the cracking resulting from the solid strong acid. And, in the downstream portion in which the loading amount of the noble metal is increased, since the low-molecular weight HC and the $NO_x$ react efficiently, the $NO_x$ purifying performance is improved.

When not only the content of the zeolite is increased in the upstream portion but also the loading amount of the noble metal is decreased, since the loading density of the noble metal decreases so excessively that the noble metal is put into a state in which the noble metal is poisoned by the adsorption of the HC, the activity slightly decreases with respect to the case where each of the arrangements is employed independently. Therefore, it is desirable to independently employ each of the aforementioned arrangements.

When the zeolite is contained more in the upstream portion, it is desired that the content of the upstream portion is from 2 to 8 times with respect to the content of the downstream portion. When it is less than this range, the effect resulting from the larger containing in the upstream portion cannot obtained, when the content of the upstream portion is larger than this range, the time period is prolonged in which the HC are not supplied to the downstream side, and the $NO_x$ purifing performance degrades. Or there might arise a case where the HC poisoning is caused by the emission of a large amount of the HC.

When the noble metal loading amount is decreased in the upstream portion, it is desired that the loading amount of the noble metal of the upstream portion is from 0.1 to 0.75 times of the loading amount of the downstream portion. When the loading amount of the noble metal of the upstream portion is less than this range, there arises the poisoning resulting from the adsorbed HC so that the reactions in the upstream portion degrade, and the purifying performance degrades as a whole. When the loading amount of the noble metal of the upstream portion is larger than this range, since the oxidation reactions of the HC in the upstream portion are facilitated, the adsorbing amount of the HC in the upstream portion decreases, since the heat generation resulting from the oxidation reactions increases, the adsorbing efficiency of the HC decreases. Therefore, the $NO_x$ purifying performance degrades.

The upstream portion can desirably fall in the range of from 15 to 67% by volume of the entire third catalyst. When the volume of the upstream portion is less than this range, the aforementioned operation is not effected, when it is more than this range, since most of the support is acidified, the $NO_x$ are inhibited from adsorbing onto the catalytic active sites, and the $NO_x$ purifying performance degrades.

Concerning the content of the solid strong acid contained in the upstream portion, when it is contained in a small amount, the operation is effected in its own way. However, when it is contained in an amount of 120 g or more with respect to 1 liter of the support, not only the effect saturates, but also the amount of the porous support reduces relatively so that the HC adsorbing amount decreases, and there arises a drawback in that the purifying activity decreases, and so on.

When manufacturing the third catalyst in which the content of the solid strong acid of the upstream portion differs from that of the downstream portion, it can be constituted by forming each of the upstream portion and the downstream portion separately, by lining each of them in this order, and by disposing each of them in an exhaust gas flow passage. Alternatively, after impregnating amorphous zirconia, alumina, or the like, into a honeycomb support, it can be formed by immersing the upstream portion only into sulfuric acid, or the like.

In the aforementioned first catalyst, the support can desirably comprise a strongly-acidified zeolite whose silicon-to-aluminum molar ratio (Si/Al) is 150 or more, a porous support and an oxygen releasing material; and the noble metal can desirably be loaded on at least one of the porous support and the oxygen releasing material. Hereinafter, the catalyst of this arrangement will be referred to as a "fourth catalyst".

In accordance with the aforementioned fourth catalyst, by adjusting the Si/Al ratio of the zeolite to 150 or more, since the elimination of aluminum hardly occurs, the chronological decrement of the HC adsorbing ability is inhibited. Moreover, since the acidic sites are less, the caulking is suppressed.

However, when a noble metal is loaded on a zeolite, the HC are inhibited from adsorbing onto the zeolite by the reaction heat resulting from the oxidation reactions of the HC. Moreover, the noble metal loaded in the pores of the zeolite decreases the active sites by the enclosure of the pores resulting from the caulking.

Hence, in the fourth catalyst, it is desired that the noble metal is arranged in such a manner that it is not loaded on the zeolite. With this arrangement, the adsorption of the HC onto the zeolite is carried out smoothly, and since the activity of the noble metal is inhibited from degrading, the $NO_x$ purifying performance is improved.

By the way, in the zeolite whose Si/Al ratio is 150 or more, since the acidic sites are less, the cracking ability is low, the cracking of the SOF occurs insufficiently, and there arises a drawback in that the $NO_x$ are reduced and purified insufficiently by the HC.

Therefore, in the fourth catalyst, the zeolite is strongly-acidified and is then used. By strongly acidifying, the property of cracking the SOF is secured, and the reduction conversion efficiency of the $NO_x$ is improved remarkably by the HC produced by cracking.

The porous support is used mainly for the purpose of loading the noble metal. As for this porous support, it is preferable to select at least one member from the group consisting of titania, zirconia and silica. Since alumina is likely to adsorb $SO_2$, and since there arises a case where the activity degrades by the sulfur poisoning, alumina is not preferable.

Moreover, since not only NO but also oxygen present abundantly in an atmosphere are adsorbed onto the noble metal, there arises the oxygen poisoning in which the surface of the noble metal is covered with the oxygen so that the activity degrades. However, it was revealed that, when a noble metal is loaded on a porous support comprising at least one member selected from the group consisting of titania, silica and zirconia, the oxygen poisoning is suppressed compared with the case where the noble metal is loaded on alumina. Therefore, by loading the noble metal on the porous support, the degradation of the activity resulting from the oxygen poisoning is suppressed, and a high durability is exhibited.

The porous support can preferably be arranged in such a manner that at least one member selected from the group consisting of titania, zirconia and silica is coated on alumina and that the noble metal is loaded on the resulting coating layer. With this arrangement, since a highly acidic oxide layer is formed on the outermost surface, the sulfur oxides in the exhaust gas are inhibited from approaching the loaded noble metal, and the sulfur poisoning of the noble metal is suppressed. The influence of the alumina of a high specific surface area is exhibited greatly, and the granular growth of the noble metal is also suppressed.

In addition, it is preferable to strongly acidify at least one coating layer formed on the alumina surface and selected from the group consisting of titania, zirconia and silica. With this arrangement, since the acidity of the surface is furthermore enhanced, the sulfur poisoning is furthermore suppressed. Moreover, by making the strongly-acidified oxide layer, the oxygen poisoning of the noble metal is furthermore suppressed. Therefore, by making an arrangement in which the noble metal is loaded on the strongly-acidified oxide layer of the outermost surface, the durability of the $NO_x$ purifying activity is furthermore improved.

The oxygen releasing material approaches the surface of the fourth catalyst, which is turned into a rich atmosphere by the emission of the HC from the zeolite, to the stoichiometric point by the emission of oxygen, thus, the oxidation of the NO to $NO_2$ occurring on the surface of the noble metal is facilitated so that the NO is likely to react with the HC, and thereby the oxygen releasing material has a function of improving the $NO_x$ purfying ability.

Therefore, it is preferable to load the noble metal on the surface of the oxygen releasing material. With this arrangement, the aforementioned operations are carried out smoothly, and the $NO_x$ purifying ability is furthermore improved. Moreover, by loading the noble metal, an operation is effected in which the oxygen releasing speed is improved.

As for this oxygen releasing material, it is possible to employ ceria. Moreover, it is preferable to employ stabilized ceria by solving zirconia. In this case, a composition ratio of the ceria-zirconia composite oxide is not limited in particular, however, there are the following properties, namely the composite oxide of $Zr/Ce \leq 1$ by molar ratio has a high oxygen releasing ability but is likely to be subjected to the sulfur poisoning, and the composite oxide of $Zr/Ce>1$ has resistance to the sulfur poisoning but has a low oxygen releasing ability.

Hence, it is preferable to form a coating layer, comprising at least one member selected from the group consisting of titania, zirconia and silica, on a Bsurface of the ceria-zirconia composite oxide of $Zr/Ce<1$. With this arrangement, while securing a high oxygen releasing ability, the sulfur poisoning can be suppressed. Moreover, when the coating layer is acidified strongly, it is possible for the oxygen releasing material to effect a cracking operation.

The zeolite can be strongly acidified directly, however, in the aforementioned first catalyst, it is desirable to employ a support comprising a zeolite whose Si/Al ratio is 150 or more and a strongly-acidified oxide layer which is coated on a surface of the zeolite, which includes at least one member selected from the group consisting of titania, zirconia and silica, and which is strongly-acidified by an acid treatment. Hereinafter, the catalyst of this arrangement will be referred to as a "fifth catalyst".

When the noble metal is loaded on the strongly-acidified oxide layer formed on a surface of the zeolite, since the reactions of the HC and the $NO_x$ occur securely on the noble metal at the time of releasing the HC which are adsorbed onto the zeolite, and since a probability of the reactions of the HC, which are turned into the low-molecular weight HC by cracking, and the $NO_x$ increases, the conversion of the $NO_x$ is furthermore improved.

It is possible to form the strongly-acidified oxide layer by forming an oxide layer, comprising at least one member selected from the group consisting of titania, zirconia and silica, on a surface of the zeolite and by carrying out a strongly-acidifying treatment to the oxide layer. In order to form the oxide layer, it is possible to form by dispersing the aforementioned zeolite in an aqueous solution of at least one nitrate of titan, zirconium and silicon, by adding an ammonia aqueous solution to cause co-precipitation, and thereafter by carrying out filtering, drying and burning. And, it is possible to carry out the strongly-acidified treatment by treating the zeolite provided with the oxide layer with a strong acid aqueous solution of sulfuric acid, molybdic acid, tungstic acid, and by carrying out filtering, drying and burning.

This strongly-acidified oxide layer can preferably be formed so that the zeolite is composed of from 10 to 20 with respect to 1 of the strongly-acidified oxide by weight ratio.

When the strongly-acidified oxide is less than this range, the effect of forming the strongly-acidified oxide layer cannot be obtained, when it is more than this range, since the pores of the zeolite are closed, the HC adsorbing ability degrades and the $NO_x$ purifying activity degrades.

In the fifth catalyst, the noble metal can be loaded on either one of the zeolite and the strongly-acidified oxide layer, however, it is desirable to load the noble metal on the strongly-acidified oxide layer. With this arrangement, the probability of the reactions between the HC, which are turned into the low-molecular weight HC by cracking, and the $NO_x$ increases, and the conversion of the $NO_x$ is furthermore improved.

Note that, in the fifth catalyst, it is preferable to load the noble metal on an oxide, such as silica, titania and zirconia, and to mix it with the zeolite provided with the strongly-acidified oxide layer. With this arrangement, compared with the case where the noble metal is loaded on the strongly-acidified oxide layer, the NO in the exhaust gas is likely to adsorb onto the noble metal, and the $NO_x$ can be reduced and purified furthermore securely by the HC which are released by way of the strongly-acidified oxide layer. In this case, it is unpreferable to employ alumina as the loading support of the noble metal. The reason is that alumina is likely to adsorb $SO_x$, and there arises a case where the activity is degraded by the sulfur poisoning.

Namely, in the fifth catalyst, by employing the zeolite whose Si/Al ratio is 150 or more, the chronological degradation of the HC adsorbing ability is suppressed, by forming the strongly-acidified oxide layer on the surface, a sufficient cracking ability is secured. Therefore, the SOF in the exhaust gas is subjected to cracking by the strongly-acidified oxide layer, and the generated HC and the HC in the exhaust gas are adsorbed onto the zeolite.

Whilst, concerning the $NO_x$ in the exhaust gas, a part of them is further oxidized by the oxygen in the exhaust gas on the surface of the noble metal, but they are reduced and purified to $N_2$ by reacting with the HC, which are released from the zeolite, on the surface of the noble metal.

In the fast catalyst, it is desired that at least one $NO_x$ oxidizing agent selected from the group consisting of Ir, Pd, Rh, In, Mn and Fe is loaded on said support. By loading such an $NO_x$ oxidizing agent, the reaction, $NO \rightarrow NO_2$, is facilitated, and the $NO_x$ area likely to adsorb onto the noble metal of the catalyst. Accordingly, the $NO_x$ are concentrated adjacent to the noble metal, and are efficiently reduced by the low-grade HC which are formed by cracking, thereby furthermore improving the $NO_x$ conversion. Note that the loaded Mn and Fe are turned into oxides by burning in the catalyst generating process.

The loading amount of the $NO_x$ oxidizing agent can appropriately fall in the range of from 0.01 to 1.5 mol with respect to 1 liter of the support. When the loading amount is less than this rage, the aforementioned operation is not effected, when the $NO_x$ oxidizing agent is loaded more than this range, the $NO_x$ reduction reactions are obstructed, and the $NO_x$ conversion decreases.

Moreover, in the first catalyst, it is desired that an oxygen releasing material and an $NO_x$ adsorbing material are contained. By the oxygen releasing material, the reaction, $NO \rightarrow NO_2$, is furthermore facilitated, and the resulting $NO_x$ are stored in the $NO_x$ adsorbing material, and thereby the emission of the $NO_x$ is suppressed in an oxygen-rich atmosphere. And, the $NO_x$, which are released from the $NO_x$ adsorbing material, react with the HC, which are released from the HC adsorbing material, and are thereby reduced. Therefore, since the storage and reduction of the $NO_x$ are facilitated, the $NO_x$ conversion is furthermore improved. Moreover, since the SOF adsorbed onto the catalyst is oxidized by the oxygen, which is released from the oxygen releasing material, the elimination of the SOF is facilitated.

The types of the used oxygen releasing material can be similar to those described above in the fourth catalyst. Moreover, the $NO_x$ adsorbing material is referred to as oxide, carbonate, or the like, of a metal selected from the group consisting of alkali metals, alkaline-earth metals and rare-earth elements, and is contained in the range of from 0.01 to 1.0 mol with respect to 1 liter of the support.

BEST MODE FOR CARRYING OUT THE INVENTION

<Mode of a First Series>

Figure 1:
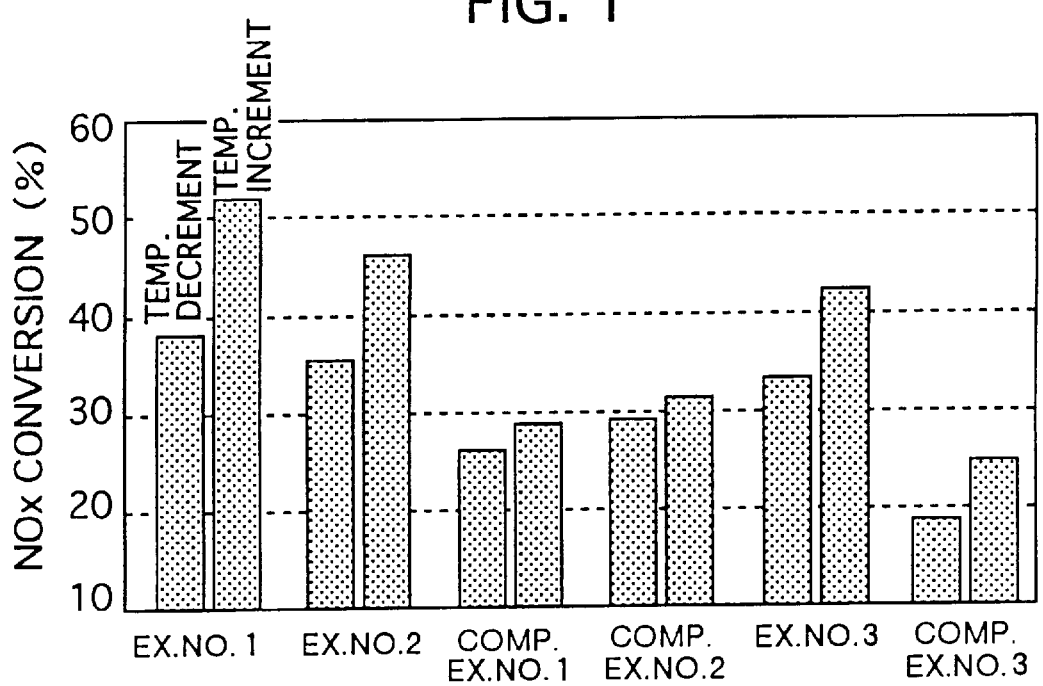
FIG. 1 is a graph for illustrating $NO_x$ conversions during a temperature increment and a temperature decrement with regard to catalysts of Example Nos. 1–3 and Comparative Examples Nos. 1–3.

In this mode, examples of the first catalyst and their performances are verified.

EXAMPLE NO. 1

First, mordenite (made by TOSO Co., Ltd.: Mor30, acidity function Ho=−8) working as the HC adsorbing material, alumina sulfate with Pt loaded and working as the solid strong acid, cerium sulfate-zirconium composite oxide with Pt loaded and working as the solid strong acid, a silica sol having a solid content of 25% and working as a binder, and pure water were prepared.

Here, the alumina sulfate was prepared by treating an alumina powder with 1N sulfuric acid, and thereafter by drying it at 100° C. for 1 hour, and by burning it at 600° C. for 1 hour. And, a dinitrodiammine platinum aqueous solution having a predetermined concentration was prepared, this alumina sulfate powder was immersed into this, and thereafter excessive water was dried, and the alumina sulfate powder was burned at 250° C. Thus, the alumina sulfate with Pt loaded and working as the solid strong acid was obtained.

Moreover, the cerium sulfate-zirconium composite oxide was prepared as follows. Namely, 26.7 g of zirconium oxynitrate working as a water-soluble metallic salt and 43.4 g of cerium nitrate were mixed, 55 g of this mixture was solved with 1,000 g of pure water, and thereafter the resulting mixture was immersed into an ammonia aqueous solution having a concentration of 25% to carry out an alkalifying treatment. Thus, cerium hydroxide-zirconium was precipitated. This one was dried at 100° C. for 1 hour, and thereafter was immersed into 1N sulfuric acid to carry out an acidifying treatment. Thereafter, this one was dried, and thereafter was burned at 600° C. for 1 hour, thereby obtaining the cerium sulfate-zirconium composite oxide. This cerium sulfate-zirconium composite oxide comprised Ce and Zr in a molar ratio of 1:1. Then, on this cerium sulfate-zirconium composite oxide, Pt was loaded in the same manner as described above, thereby obtaining the cerium sulfate-zirconium composite oxide with Pt loaded and working as the solid strong acid.

In Example No. 1, these were mixed in proportions set forth in Table 1, thereby preparing a slurry. Unless otherwise specified, "parts" mean parts by weight.

TABLE 1

| | |
|---|---|
| Mordenite (Mor30) | 150 parts |
| Alumina Sulfate with Pt Loaded | 75 parts |
| Cerium Sulfate-Zirconium Composite Oxide with Pt Loaded | 30 parts |
| Silica Sol | 85 parts |
| Pure Water | 295 parts |

Thereafter, a honeycomb-shaped support substrate made from cordierite (volume 1.7 liter) was prepared, and this substrate was immersed into this slurry. Thereafter, this substrate was taken up, and the excessive slurry was blown off, after drying, the substrate was burned at 300° C. for 1 hour. Thus, a loading layer was formed on the support substrate. The loading amount of the loading layer was 30 g with respect to 1 liter of the support substrate. Moreover, the loading amount of Pt was 2 g with respect to 1 liter of the support substrate later described.

Thus, a catalyst of Example No. 1 was obtained.

EXAMPLE NO. 2

First, the aforementioned mordenite, the aforementioned alumina sulfate powder with Pt loaded, a cerium-zirconium composite oxide with Pt loaded, the aforementioned silica sol, and pure water were prepared.

Here, the cerium-zirconium composite oxide was prepared by mixing 172 g of ceria and 123 g of zirconia and by burning this mixture at 600° C. for 1 hour. This cerium-zirconium composite oxide also comprised Ce and Zr in a molar ratio of 1:1. Then, on this cerium-zirconium composite oxide, Pt was loaded in the same manner as described above, thereby obtaining the cerium-zirconium composite oxide with Pt loaded.

In Example No. 2, these were mixed in proportions set forth in Table 2, thereby preparing a slurry.

TABLE 2

| | |
|---|---|
| Mordenite (Mor30) | 150 parts |
| Alumina Sulfate with Pt Loaded | 75 parts |
| Cerium-Zirconium Composite Oxide with Pt Loaded | 30 parts |
| Silica Sol | 85 parts |
| Pure Water | 295 parts |

Thereafter, in the same manner as Example No. 1, a loading layer was formed on the aforementioned support substrate. Thus, a catalyst of Example No. 2 was obtained.

COMPARATIVE EXAMPLE NO. 1

First, the aforementioned mordenite, alumina with Pt loaded, the aforementioned silica sol, and pure water were prepared.

Here, on the alumina, Pt was loaded in the same manner as described above.

In Comparative Example No. 1, these were mixed in proportions set forth in Table 3, thereby preparing a slurry.

TABLE 3

| | |
|---|---|
| Mordenite | 150 parts |
| Alumina with Pt Loaded | 75 parts |
| Silica Sol | 85 parts |
| Pure Water | 295 parts |

Thereafter, in the same manner as Example No. 1, a loading layer was formed on the aforementioned support substrate. Thus, a catalyst of Comparative Example No. 1 was obtained.

COMPARATIVE EXAMPLE NO. 2

First, the aforementioned mordenite, the aforementioned alumina with Pt loaded, the aforementioned cerium-zirconium composite oxide with Pt loaded, the aforementioned silica sol, and pure water were prepared.

Here, on the alumina, Pt was loaded in the same manner as described above.

Moreover, on the cerium-zirconium composite oxide, Pt was loaded in the same manner as described above.

In Comparative Example No. 2, these were mixed in proportions set forth in Table 4, thereby preparing a slurry.

TABLE 4

| | |
|---|---|
| Mordenite (Mor30) | 150 parts |
| Alumina with Pt Loaded | 75 parts |
| Cerium-Zirconium Composite Oxide with Pt Loaded | 30 parts |
| Silica Sol | 85 parts |
| Pure Water | 295 parts |

Thereafter, in the same manner as Example No. 1, a loading layer was formed on the aforementioned support substrate. Thus, a catalyst of Comparative Example No. 2 was obtained.

EXAMPLE NO. 3

First, the aforementioned mordenite, zirconia sulfate with Pt loaded and working as the solid strong acid, the aforementioned cerium-zirconium composite oxide with Pt loaded, the aforementioned silica sol, and pure water were prepared.

Here, zirconia sulfate is prepared by treating a zirconia powder with 1N sulfuric acid, and thereafter by drying it at 100° C. for 1 hour, and by burning it at 600° C. for 1 hour. And, Pt was loaded in the same manner as described in the aforementioned manner, thereby obtaining the zirconia sulfate with Pt loaded and working as the solid strong acid.

Moreover, on the cerium-zirconium composite oxide, Pt was loaded in the same manner as described above.

In Example No. 3, these were mixed in proportions set forth in Table 5, thereby preparing a slurry.

TABLE 5

| | |
|---|---|
| Mordenite (Mor30) | 150 parts |
| Zirconia Sulfate with Pt Loaded | 75 parts |
| Cerium-Zirconia Composite Oxide with Pt Loaded | 30 parts |
| Silica Sol | 85 parts |
| Pure Water | 295 parts |

Thereafter, in the same manner as Example No. 1, a loading layer was formed on the aforementioned support substrate. Thus, a catalyst of Example No. 3 was obtained.

COMPARATIVE EXAMPLE NO. 3

First, mordenite (made by TOSO Co., Ltd.: Mor203, acidity function Ho=−7) which was a porous oxide having an HC adsorbing ability but could not be said to be a solid strong acid, the aforementioned alumina with Pt loaded, the aforementioned cerium-zirconium composite oxide with Pt loaded, the aforementioned silica sol, and pure water were prepared.

Here, on the alumina, Pt was loaded in the same manner as described above.

Moreover, on the cerium-zirconium composite oxide, Pt was loaded in the same manner as described above.

In Comparative Example No. 3, these were mixed in proportions set forth in Table 6, thereby preparing a slurry.

TABLE 6

| | |
|---|---|
| Mordenite (Mor203) | 150 parts |
| Alumina with Pt Loaded | 75 parts |
| Cerium-Zirconium Composite Oxide with Pt Loaded | 30 parts |
| Silica Sol | 85 parts |
| Pure Water | 295 parts |

Thereafter, in the same manner as Example No. 1, a loading layer was formed on the aforementioned support substrate. Thus, a catalyst of Comparative Example No. 3 was obtained.

EVALUATION NO. 1

Catalysts of Example Nos. 1–3 and Comparative Example Nos. 1–3 were attached to a converter, and were used in a 2,400 c.c. in-line 4-cylinder diesel engine, and after a durability process at 600° C. for 100 hours, an evaluation test was carried out. This evaluation test was carried out as follows: when a light oil was supplied in the range of from 300 to 1,200 ppmC (average 1,000 ppmC) in front of the catalysts, while the number of revolutions was kept constant at 1,200 rpm, when the load was varied continuously, and when the inlet gas temperature was increased from 150 up to 450° C., the temperature increment characteristic and the temperature decrement characteristic of the $NO_x$ conversions (%) were examined. The results are illustrated in FIG. 1.

From FIG. 1, it is understood that the catalysts of Example Nos. 1 through 3, compared with the catalyst of Comparative Example Nos. 1–3, could exhibit higher $NO_x$ conversions in terms of both the temperature increment characteristic and the temperature decrement characteristic. Therefore, it is understood that, even in an exhaust gas in an oxygen-rich atmosphere, catalysts of Example Nos. 1 through 3 can exhibit securely high $NO_x$ conversions.

EVALUATION NO. 2

By using the catalysts of Example No. 2 and Comparative Example No. 1, the cracking abilities with regard to $C_{10}H_{22}$ were measured by a GC (gas chromatography) analysis apparatus. The results are illustrated in FIG. 2.

Figure 2:
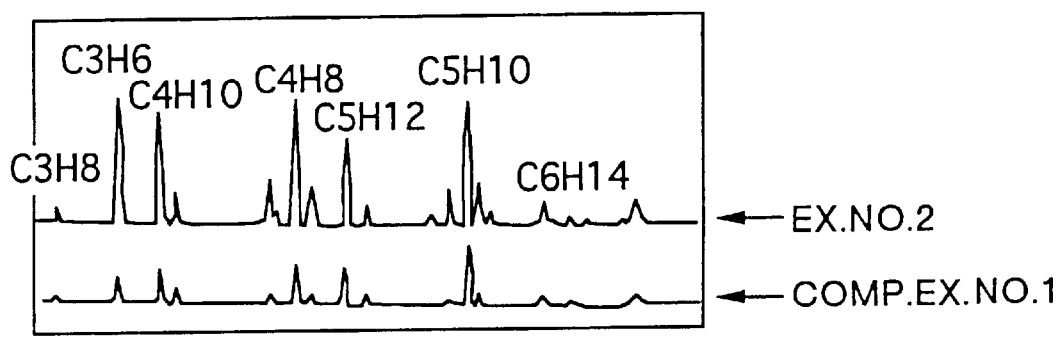
FIG. 2 is a graph for illustrating GC analysis results with regard to catalysts of Example No. 2 and Comparative Example No. 1.

From FIG. 2, it is understood that the catalyst of Example No. 2 is superior to the catalyst of Comparative Example No. 1 in terms of the HC cracking ability.

EVALUATION NO. 3

By using the catalysts of Comparative Example No. 1 and Comparative Example No. 3, the cracking abilities before the durability process with regard to $C_{10}H_{22}$ were measured by a GC analysis apparatus. The results are illustrated in FIG. 3.

Figure 3:
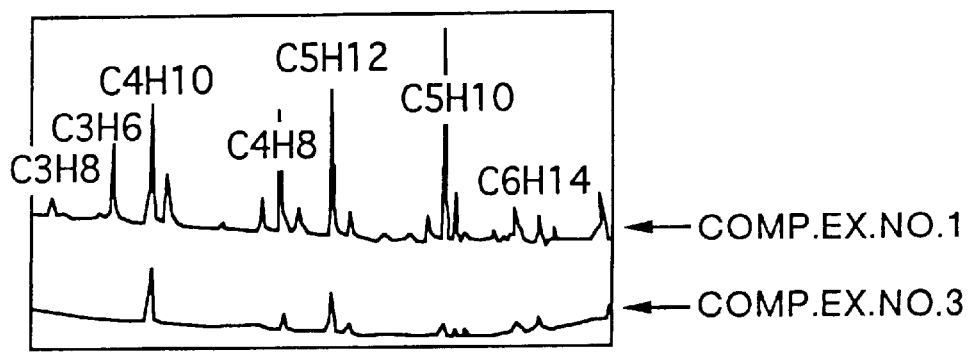
FIG. 3 is a graph for illustrating GC analysis results with regard to catalysts of Comparative Example No. 1 and Comparative Example No. 3.

From FIG. 3, it is understood that the catalyst of Comparative Example No. 1 is superior to the catalyst of Comparative Example No. 3 in terms of the HC cracking ability.

EVALUATION NO. 4

The catalyst of Example No. 1 was attached to a converter, and was used in a 2,400 c.c. in-line 4-cylinder engine. And, the inlet gas temperature was increased from 150 up to 450° C., thereby evaluating the temperature increment characteristic and the temperature decrement characteristic of the $NO_x$ conversions (%). The results are illustrated in FIG. 4.

Figure 4:
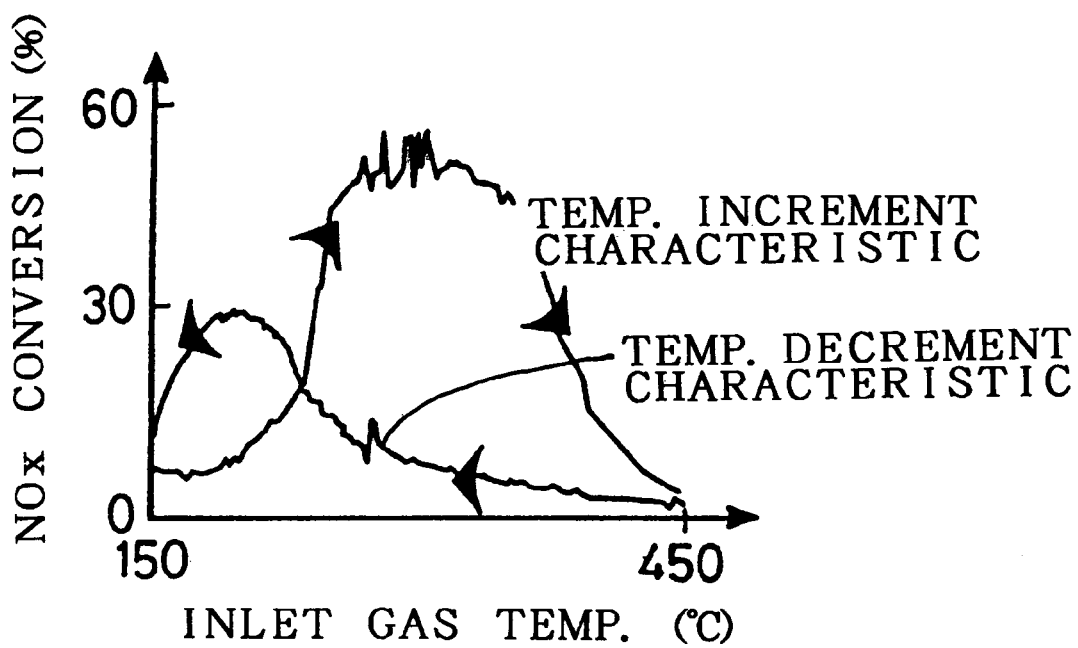
FIG. 4 is concerned with a catalyst of Example No. 1 and is a graph for illustrating relationships between inlet gas temperatures and $NO_x$ conversions.

From FIG. 4, it is understood that, in the catalyst of Example No. 1, the temperature increment characteristic is superior to the temperature decrement characteristic.

The results of above Evaluation Nos. 1–4 are derived from the arrangement that, in the catalysts of Example Nos. 1–3, the high-grade HC in the exhaust gas and the light oil working as the high-grade HC are subjected to cracking by, the alumina sulfate, the cerium nitrate-zirconium composite oxide or the zirconia sulfate working as the solid strong acid, and thereby the low-grade HC having high reactivities to $NO_x$ are generated. On this occasion, in the catalysts of Example Nos. 1–3, since the cracking of the light oil occurs in the catalysts, it is considered that even the low-grade HC, which are less likely to adsorb onto Pt, are likely to adsorb onto Pt.

In particular, since the catalysts of Example Nos. 1 and 2 are provided with the alumina sulfate and the cerium sulfate-zirconium composite oxide working as the solid strong acid, they exhibit high $NO_x$ conversions. On the other hand, in the catalysts of Comparative Example Nos. 1 and 2, since the cracking of the HC are carried out not by the alumina sulfate and the cerium sulfate-zirconium composite oxide but by the mordenite (Mor30) which has an HC adsorbing ability and works as the solid strong acid, they are inferior to the catalysts of Example Nos. 1 and 2 in terms of the cracking abilities and are slightly inferior thereto in terms of the $NO_x$ conversions. Moreover, in the catalyst of Example No. 1, the cerium sulfate-zirconium composite oxide has not only the properties of the solid strong acid but also an oxygen storage ability. Also in the catalyst of Comparative Example No. 2, the cerium-zirconium composite oxide has an oxygen storage ability. Hence, the catalysts of Example No. 1 and Comparative Example No. 2 respectively exhibit higher $NO_x$ conversions than the catalysts of Example No. 2 and Comparative Example No. 1.

On the other hand, since the catalyst of Comparative Example No. 3 employs the mordenite (Mor203) which has less acidic sites and from which an HC cracking ability cannot be expected, it is inferior to the catalyst of Comparative Example No. 2 in terms of the $NO_x$ conversion.

Moreover, since the catalyst of Example No. 3 employs the zirconia sulfate, which is inferior to the alumina sulfate in terms of the specific surface area and the heat resistance, as the solid strong acid, it is slightly inferior to the catalyst of Example No. 2 in terms of the $NO_x$ conversion. Hence, since the solid strong acid is highly dispersed by employing the alumina sulfate as the solid strong acid, and since the highly dispersed state can be maintained even after the durability process, it is understood to be further preferable.

Therefore, it is most preferred that the mordenite (Mor30) having the HC adsorbing ability and working as the solid strong acid is employed as the porous oxide, and that the alumina sulfate and the cerium sulfate-zirconium composite oxide are employed as the other solid strong acid, and further that the oxygen storage ability of the cerium sulfate-zirconium composite oxide working as the solid strong acid can be utilized.

In the catalysts of Example Nos. 1, 2 and 3, it is considered that the solid strong acids (let the metals, such as Ce and Zr, be M.) comprising the alumina sulfate, cerium sulfate-zirconium composite oxide carry out the cracking of the HC because of the dehydrogenation reaction of the HC by the acidic sites resulting from $H^+$ (Broensted acidic sites) of the solid strong acid and $M^+$ (Lewis acidic sites) due to the inductive effect of S=O.

<Mode of a Second Series>

In this mode, examples of the second catalyst and their performances are verified.

COMPARATIVE EXAMPLE NO. 4

Figure 5:
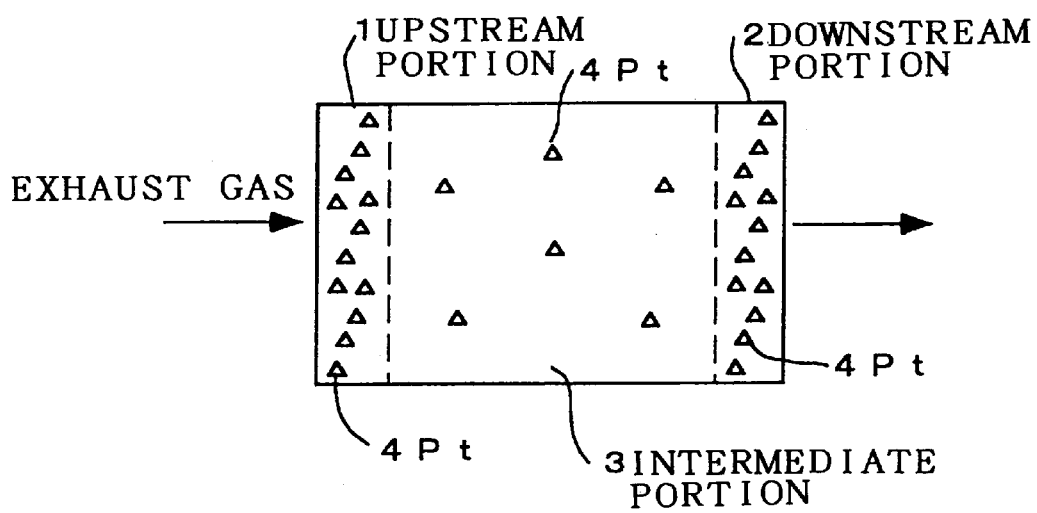
FIG. 5 is a diagrammatic explanatory view on an arrangement of a catalyst for purifying an exhaust gas of Example No. 6.

In FIG. 5, a diagrammatic view of a catalyst for purifying an exhaust gas of this comparative example is illustrated. This catalyst for purifying an exhaust is constituted by an upstream portion 1 and a downstream portion 2 on which Pt 4 is loaded more and an intermediate portion 3 on which a loading amount of Pt 4 is less.

Hereinafter, a manufacturing method of this catalyst for purifying an exhaust gas will be described in place of a detailed description of the arrangement.

A cylinder-shaped honeycomb support substrate (diameter 100 mm, entire length 150 mm, number of cells 40 pieces/in$^2$) made from cordierite was prepared, was immersed into a slurry whose major component was mordenite 30, was thereafter taken up therefrom to blow off the excessive slurry, was dried at 120° C. for 1 hour, and was burned at 500° C. for 1 hour, thereby forming a coating layer. The coating layer was formed in an amount of 100 g with respect to 1 liter of the honeycomb support substrate.

Next, a dinitrodiammine platinum nitrate aqueous solution having a predetermined concentration was prepared, and the entire honeycomb support substrate having the coating layer was immersed therein for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

Further, a dinitrodiammine platinum nitrate aqueous solution having a predetermined concentration was prepared, and the honeycomb support substrate having the coating layer with Pt loaded was immersed therein at the opposite ends by a length of 15 mm from the opposite ends respectively for 5 minutes. Thereafter, the excessive water droplets were blown off, and the honeycomb support substrate was dried at 120° C. for 1 hour, and thereafter was burned at 300° C. for 1 hour, thereby further loading Pt on the upstream portion 1 and the downstream portion 2. The loading amounts of additional Pt were 3 g with respect to 1 liter of the volume of the respective opposite ends, and the summed loading amounts together with Pt loaded in advance were 5 g with respect to 1 liter of the volume of the respective opposite ends of the upstream portion 1 and the downstream portion 2.

COMPARATIVE EXAMPLE NO. 5

Figure 6:
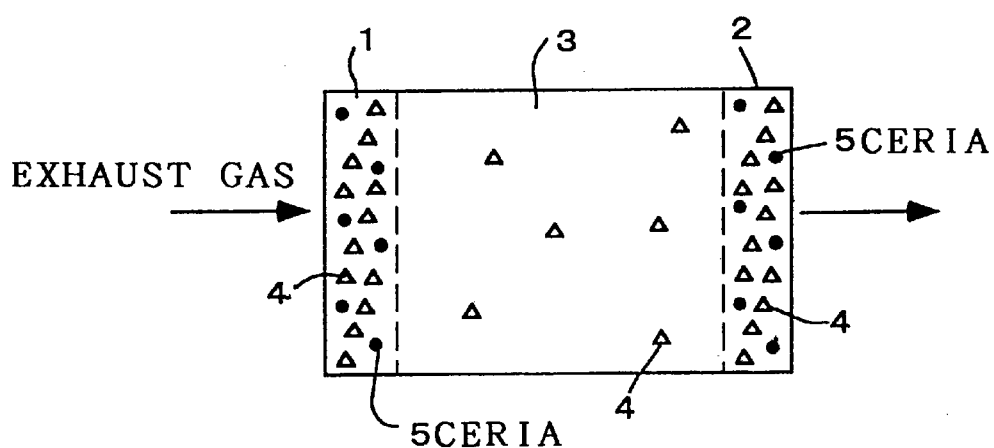
FIG. 6 is a diagrammatic explanatory view on an arrangement of a catalyst for purifying an exhaust gas of Example No. 7.

In FIG. 6, a diagrammatic view of a catalyst for purifying an exhaust gas of a fifth comparative example is illustrated. This catalyst for purifying an exhaust gas is constituted by an upstream portion 1 and a downstream portion 2 on which Pt 4 is loaded more and an intermediate portion 3 on which a loading amount of Pt 4 is less, and ceria (cerium oxide) 5 is contained in the upstream portion 1 and the downstream portion 2.

A honeycomb support substrate was used on which a coating layer similar to that of Comparative Example No. 4 was formed, and the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein at the opposite ends by a length of 15 mm from the opposite ends respectively for 5 minutes. Thereafter, the excessive water droplets were blown off, and the honeycomb support substrate was dried at 120° C. for 1 hour, and thereafter was burned at 300° C. for 1 hour, thereby further loading Pt on the opposite ends. The loading amounts of additional Pt were 3 g with respect to 1 liter of the volume of the respective opposite ends, and the summed loading amounts together with Pt loaded in advance were 5 g with respect to 1 liter of the volume of the respective opposite ends.

Further, a cerium acetate aqueous solution having a predetermined concentration was prepared in a predetermined amount, was adsorbed into the portions by a length of 15 mm from the opposite ends, on which Pt was loaded in an amount of 5 g/L, in total. And, the honeycomb support substrate was dried at 120° C. for 1 hour, and thereafter was heated at 500° C. for 1 hour to evaporate and dry, thereby loading ceria 5 on the upstream portion 1 and the downstream portion 2 only. The loading amounts of ceria 5 were 0.5 mol respectively with respect to 1 liter of the volume of the respective upstream portion 1 and the downstream portion 2.

EXAMPLE NO. 4

First, a zirconium hydroxide powder was mixed in 1N sulfuric acid aqueous solution, was suction-filtered, was thereafter dried at 120° C. for 1 hour, was burned at 500° C. for 1 hour to prepare a strongly-acidified powder, and was made into a slurry. And, a honeycomb support substrate was used on which a coating layer similar to that of Comparative Example No. 4 was formed, the aforementioned strongly-acidified powder made into the slurry was coated, was dried at 120° C. for 1 hour, was thereafter burned at 500° C. for 1 hour.

Next, a dinitrodiammine platinum nitrate aqueous solution having a predetermined concentration was prepared, and the resulting honeycomb support substrate was entirely immersed therein for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein at the opposite ends by a length of 15 mm from the opposite ends respectively for 5 minutes. Thereafter, the excessive water droplets were blown off, and the honeycomb support substrate was dried at 120° C. for 1 hour, and thereafter was burned at 300° C. for 1 hour, thereby further loading Pt on the opposite ends. The loading amounts of additional Pt were 3 g with respect to 1 liter of the volume of the respective opposite ends, and the summed loading amounts together with Pt loaded in advance were 5 g with respect to 1 liter of the volume of the respective opposite ends.

EXAMPLE NO. 5

First, a zirconium hydroxide powder was mixed in 1N sulfuric acid aqueous solution, was suction-filtered, was thereafter dried at 120° C. for 1 hour, was burned at 500° C. for 1 hour to prepare a strongly-acidified powder, and was made into a slurry. And, a honeycomb support substrate was used on which a coating layer similar to that of Comparative Example No. 4 was formed, the aforementioned strongly-acidified powder made into the slurry was coated, was dried at 120° C. for 1 hour, was thereafter burned at 500° C. for 1 hour.

Next, a dinitrodiammine platinum nitrate aqueous solution having a predetermined concentration was prepared, and the resulting honeycomb support substrate was entirely immersed therein for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein at the opposite ends by a length of 15 mm from the opposite ends respectively for 5 minutes. Thereafter, the excessive water droplets were blown off, and the honeycomb support substrate was dried at 120° C. for 1 hour, and thereafter was burned at 300° C. for 1 hour, thereby further loading Pt on the opposite ends. The loading amounts of additional Pt were 3 g with respect to 1 liter of the volume of the respective opposite ends, and the summed loading amounts together with Pt loaded in advance were 5 g with respect to 1 liter of the volume of the respective opposite ends.

Further, a cerium acetate aqueous solution having a predetermined concentration was prepared in a predetermined amount, was adsorbed into the portions by a length of 15 mm from the opposite ends, on which Pt was loaded in an amount of 5 g/L, in total. And, the honeycomb support substrate was dried at 120° C. for 1 hour, and thereafter was heated at 500° C. for 1 hour to evaporate and dry, thereby loading ceria 4 on the upstream portion 1 and the downstream portion 2 only. The loading amounts of ceria were 0.5 mol respectively with respect to 1 liter of the volume of the respective upstream portion 1 and the downstream portion 2.

COMPARATIVE EXAMPLE NO. 6

A honeycomb support substrate was used on which a coating layer similar to that of Comparative Example No. 4 was formed, and the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

COMPARATIVE EXAMPLE NO. 7

A honeycomb support substrate was used on which a coating layer similar to that of Comparative Example No. 4 was formed, and the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2.6 g with respect to 1 liter of the honeycomb support substrate, and the total loading amount of Pt was identical with the total loading amount of Pt of the catalyst for purifying an exhaust gas of Example No. 1.

EXAMINATION EVALUATION

The resulting respective catalysts were attached to an actual engine, and a durability test was carried out in which an actual exhaust gas was flowed at an inlet gas temperature of 600° C. at a space velocity of 80,000/hr for 10 hours.

Figure 7:
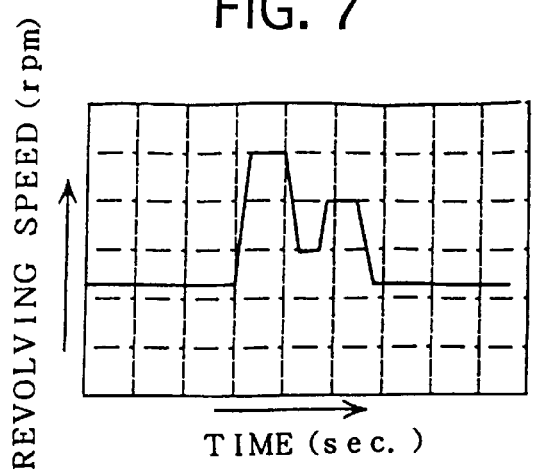
FIG. 7 is a graph for illustrating engine running conditions at the time of measuring conversions.

Next, the respective catalysts after the durability process were attached to an exhaust system of a 2,400 c.c. in-line 4-cylinder diesel engine, and the diesel engine was operated at a speed falling in the range of from 1,000 to 2,500 rpm under a state where the load was varied as illustrated in FIG. 7, thereby measuring the average values of the $NO_x$ conversions and the HC conversions. The results are respectively illustrated in FIG. 8.

Figure 8:
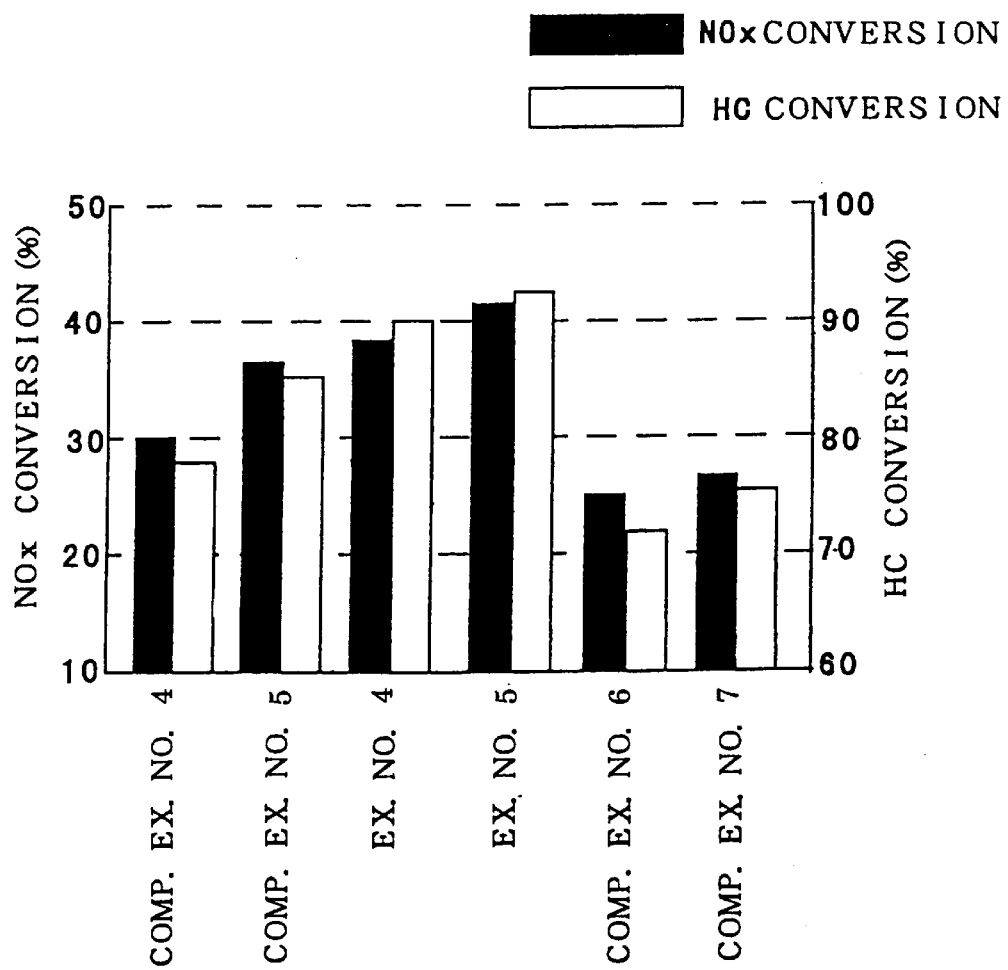
FIG. 8 is a bar graph for illustrating $NO_x$ conversions and HC conversions of catalysts for purifying an exhaust gas of Example Nos. 4 and 5 and Comparative Example Nos. 4–7.

From FIG. 8, it is apparent that the catalysts of examples exhibited higher $NO_x$ conversions respectively than comparative examples. When compared more precisely, the catalyst of Comparative Example No. 4 exhibited a higher $NO_x$ conversion than Comparative Example No. 7, it is apparent that this is an effect which results from the arrangement that the loading amounts of the upstream portion and the downstream portion are increased more than that of the intermediate portion.

Since the $NO_x$ conversions of the catalysts of Comparative Example No. 7 and Example No. 4 are higher than that of Comparative Example No. 4, the effect of loading the ceria or the strong acid on the upstream portion 1 and the downstream portion 2 is appreciated apparently. Further, since the catalysts of Example No. 5 exhibits a higher $NO_x$ conversion than Comparative Example No. 5 and Example No. 4, it is considered that the additions of the ceria and the strong acid give the respective effects independently.

<Mode of a Third Series>

In this mode, examples of the third catalyst and their performances are verified.

EXAMPLE NO. 6

Figure 9:
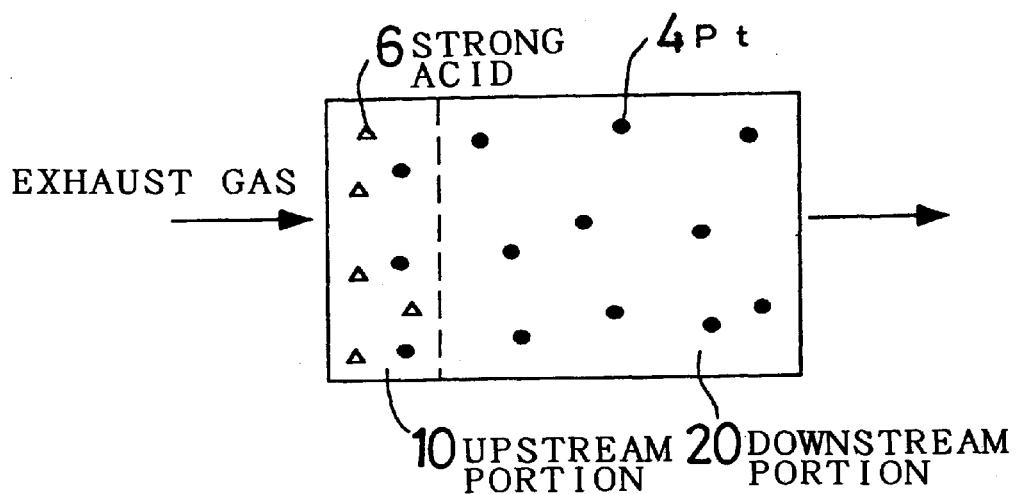
FIG. 9 is a diagrammatic explanatory view on an arrangement of a catalyst for purifying an exhaust gas of Example No. 10.

In FIG. 9, a diagrammatic view of a catalyst for purifying an exhaust gas of this example is illustrated. This catalyst for purifying an exhaust gas is constituted by an upstream portion 10 which contains Pt 3 and a solid strong acid 6 and a downstream portion 20 which contains Pt 4 but does not contain the solid strong acid 6.

Hereinafter, a manufacturing method of this catalyst for purifying an exhaust will be described in place of a detailed description of the arrangement.

First, into 1 kg of a zirconium hydroxide powder, 5 liter of 1N sulfuric acid aqueous solution was impregnated, the water content was evaporated, and thereafter was burned at 600° C., thereby preparing a solid strong acid.

A cylinder-shaped honeycomb support substrate (diameter 100 mm, entire length 150 mm, number of cells 400 pieces) made from cordierite was prepared, and a first slurry, whose major component was a powder in which mordenite 30 and the aforementioned solid strong acid were mixed in 3:1 by weight ratio, and a second slurry, which contained mordenite 30 and did not contain the solid strong acid, were used to form a coating layer on a surface of the support substrate. The first slurry was coated in the lengthwise range of 70 mm from the end surface of the upstream portion 10, and the second slurry was coated in the lengthwise range of 80 mm from the end surface of the downstream portion 20.

The downstream portion 20 was formed in an amount of 100 g with respect to 1 liter of the honeycomb support substrate, and the upstream portion 10, which was formed of the first slurry, was 100 g with respect to 1 liter of the honeycomb support substrate.

Next, a dinitrodiammine platinum nitrate aqueous solution having a predetermined concentration was prepared, and the entire honeycomb support substrate having the coating layer was immersed therein for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

The arrangements of this catalyst are set forth in Table 7 altogether.

EXAMPLE NO. 7

Except that a first slurry whose major component was a powder in which mordenite 30 and the strong acid were mixed in 2:1 by weight ratio, and a second slurry, which was the same as Example No. 6 were used, and that the coating amount of the first slurry was 120 g, a coating layer was formed in the same manner as Example No. 6.

Next, the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

EXAMPLE NO. 8

A honeycomb support substrate was used on which a coating layer similar to that of Example No. 6 was formed, and the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 1.6 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein by a length of 80 mm from the end surface of the downstream portion 2 for 1 hour. Thereafter, the excessive water droplets were blown off, and the honeycomb support substrate was dried at 120° C. for 1 hour, and thereafter was burned at 300° C. for 1 hour, thereby further loading Pt on the downstream portion 20. The loading amount of additional Pt was 0.5 g with respect to 1 liter of the volume of the downstream portion 20, and the summed loading amount together with Pt loaded in advance was 2 g with respect to 1 liter of the volume of the downstream portion 20.

EXAMPLE NO. 9

Except that a first slurry whose major component was a powder in which mordenite 30 and the strong acid were mixed in 2:1 by weight ratio, and a second slurry, which was the same as Example No. 6 were used, and that the coating amount of the first slurry was 150 g, a coating layer was formed in the same manner as Example No. 6.

Next, the entire honeycomb support substrate with the aforementioned coating layer formed was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 1.5 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein by a length of 80 mm from the end surface of the downstream portion 2 for 1 hour. Thereafter, the excessive water droplets were blown off, and the honeycomb support substrate was dried at 120° C. for 1 hour, and thereafter was burned at 300° C. for 1 hour, thereby further loading Pt on the downstream portion 20. The loading amount of additional Pt was 0.4 g with respect to 1 liter of the volume of the downstream portion 20, and the summed loading amount together with Pt loaded in advance was 2 g with respect to 1 liter of the volume of the downstream portion 20.

COMPARATIVE EXAMPLE NO. 8

Only a slurry was used whose major component was mordenite 30, a uniform coating layer was formed on the entire honeycomb support substrate in the same manner as Example No. 6. The coating layer was formed in an amount of 100 g with respect to 1 liter of the honeycomb support substrate.

Next, the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

COMPARATIVE EXAMPLE NO. 9

Only a slurry was used whose major component was mordenite 30, a uniform coating layer was formed on the entire honeycomb support substrate in the same manner as Example No. 6. The coating layer was formed in an amount of 100 g with respect to 1 liter of the honeycomb support substrate.

Further, a slurry was used whose major component was mordenite 30, a second coating layer was formed on the upstream portion only. The coating layer was formed in an amount of 60 g with respect to 1 liter of the volume of the upstream portion 1. Namely, on the upstream portion 1, a coating layer was formed in a total amount of 160 g with respect to 1 liter of its volume.

Next, the entire honeycomb support substrate was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 2 g with respect to 1 liter of the honeycomb support substrate.

COMPARATIVE EXAMPLE NO. 10

Only a slurry was used whose major component was mordenite 30, a uniform coating layer was formed on the entire honeycomb support substrate in the same manner as Example No. 6. The coating layer was formed in an amount of 100 g with respect to 1 liter of the honeycomb support substrate.

Next, the entire honeycomb support substrate with the aforementioned coating layer formed was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 1.3 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein by a length of 40 mm from the end surface of the downstream portion 2 for 1 hour. Thereafter, the excessive water droplets were blown off, and the honeycomb support substrate was dried at 120° C. for 1 hour, and thereafter was burned at 300° C. for 1 hour, thereby further loading Pt on the downstream portion 20. The loading amount of additional Pt was 0.7 g with respect to 1 liter of the volume of the downstream portion 20, and the summed loading amount together with Pt loaded in advance was 2 g with respect to 1 liter of the volume of the downstream portion 20.

COMPARATIVE EXAMPLE NO. 11

Only a slurry was used whose major component was mordenite 30, a uniform coating layer was formed on the entire honeycomb support substrate in the same manner as Example No. 6. The coating layer was formed in an amount of 100 g with respect to 1 liter of the honeycomb support substrate.

Further, only a slurry was used whose major component was mordenite 30, a second coating layer was formed on the upstream portion only. The coating layer was formed in an amount of 5 g with respect to 1 liter of the volume of the upstream portion 1. Namely, on the upstream portion 1, a coating layer was formed in a total amount of 150 g with respect to 1 liter of its volume.

Next, the entire honeycomb support substrate having the coating layer formed was immersed in a dinitrodiammine platinum nitrate aqueous solution having a predetermined concentration for 1 hour. Thereafter, the honeycomb support substrate was taken up therefrom to blow off the excessive water droplets, was dried at 120° C. for 1 hour, and thereafter was burned at 300° C. for 1 hour, thereby uniformly loading Pt on the entire coating layer. The loading amount of Pt was 1.2 g with respect to 1 liter of the honeycomb support substrate.

And, a dinitrodiammine platinum nitrate aqueous solution having a predetermined concentration was prepared, and the honeycomb support substrate having the coating layer with Pt loaded was immersed therein by a length of 80 mm from the end surface of the downstream portion 2 for 1 hour. Thereafter, the excessive water droplets were blown off, and the honeycomb support substrate was dried at 120° C. for 1 hour, and thereafter was burned at 300° C. for 1 hour, thereby further loading Pt on the downstream portion 2. The loading amount of additional Pt was 0.8 g with respect to 1 liter of the volume of the downstream portion 20, and the summed loading amount together with Pt loaded in advance was 2 g with respect to 1 liter of the volume of the downstream portion 20.

[TABLE 7]

|  | Strong Acid | | Coating Amount (g/L) | | Pt Loading Amount (g/L) | |
| --- | --- | --- | --- | --- | --- | --- |
|  | U/P*1 | D/P*2 | U/P*1 | D/P*2 | U/P*1 | D/P*2 |
| Ex. No. 6 | P*3 | N*4 | 100 | 100 | 2 | 2 |
| Ex. No. 7 | P*3 | N*4 | 120 | 100 | 2 | 2 |
| Ex. No. 8 | P*3 | N*4 | 100 | 100 | 1.6 | 2 |
| Ex. No. 9 | P*3 | N*4 | 160 | 100 | 1.5 | 2 |
| Comp. Ex. No. 8 | N*4 | N*4 | 100 | 100 | 2 | 2 |
| Comp. Ex. No. 9 | N*4 | N*4 | 160 | 100 | 2 | 2 |
| Comp. Ex. No. 10 | N*4 | N*4 | 100 | 100 | 1.3 | 2 |
| Comp. Ex. No. 11 | N*4 | N*4 | 150 | 100 | 1.2 | 2 |

*1 denotes the "Upstream Portion".
*2 denotes the "Downstream Portion".
*3 denotes "Present".
*4 denotes "None".

EXAMINATION AND EVALUATION

The resulting respective catalysts were attached to an actual engine, and a durability test was carried out in which an actual exhaust gas was flowed at an inlet gas temperature of 600° C. at a space velocity of 80,000 $h^{-1}$ for 10 hours.

Figure 10:
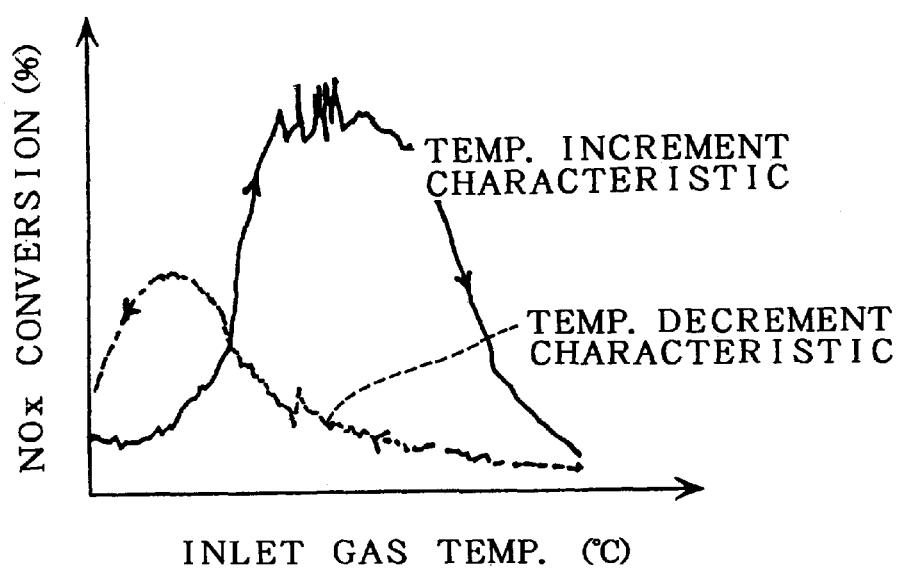
FIG. 10 is a graph for illustrating $NO_x$ purifying characteristics during a temperature increment and a temperature decrement.

Next, the respective catalysts after the durability process were attached to an exhaust system of a 2,400 c.c. in-line 4-cylinder diesel engine, and the diesel engine was operated at a speed falling in the range of from 1,000 to 2,500 rpm while varying the load continuously, thereby measuring the $NO_x$ conversions. The temperature increment characteristic and the temperature decrement characteristic of the $NO_x$ conversions are as illustrated in FIG. 10, the $NO_x$ purifying performance differs greatly between the temperature increment and the temperature decrement, the conversions are low during the temperature decrement. Hence, from graphs corresponding to FIG. 10 of the respective catalysts, maximum NO conversions during the temperature increment and during the temperature decrement were determined, the results are illustrated in FIG. 11.

Figure 11:
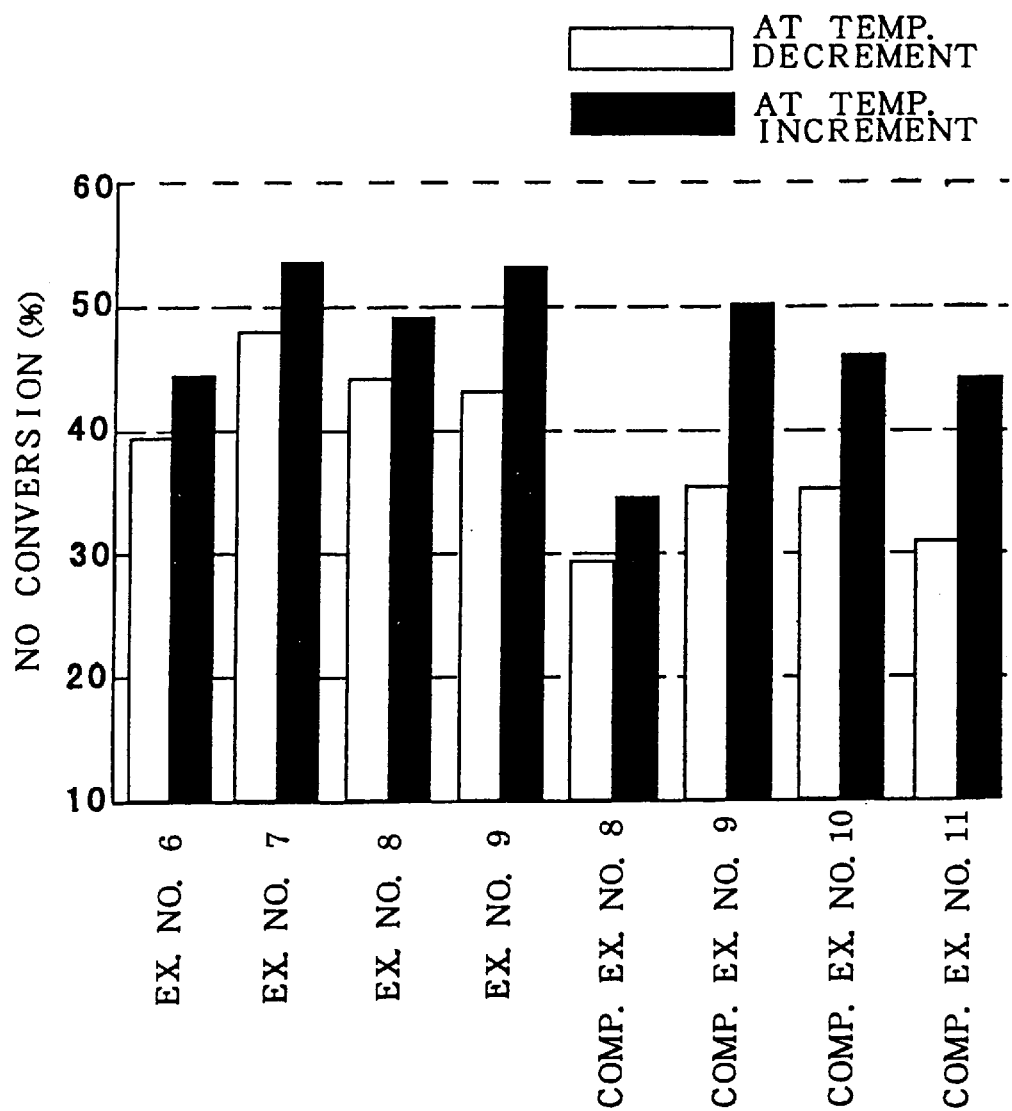
FIG. 11 is a bar graph for illustrating NO conversions of catalysts for purifying an exhaust gas of Example Nos. 6–9 and Comparative Example Nos. 8–11.

From FIG. 11, the NO conversions of the catalysts of the respective examples show higher values than comparative examples, and in particular it is understood that the NO purifying performances are good during the temperature decrement. Moreover, the catalyst of Example No. 7, whose upstream portion is coated with the mordenite in an increased amount together with the strong acid, and the catalyst of Example No. 8, whose upstream portion contains the strong acid and is loaded with Pt in a reduced amount, exhibit much higher NO conversions than Example No. 6, and accordingly it is apparent that the arrangements of Example No. 7 and Example No. 8 are furthermore effective.

In the catalyst of Example No. 9, the NO conversion during the temperature decrement is slightly less than Example No. 8, this is believed as follows: since a small amount of Pt is loaded on a large amount of the mordenite in the catalyst of Example No. 9, the loading density of Pt is decreased in the catalyst as a whole, and the poisoning caused by the HC arises in the upstream portion.

<Mode of a Fourth Series>

In this mode, examples of the fourth catalyst and their performances are verified.

EXAMPLE NO. 10

<Zeolite>

1,000 parts of a commercially available mordenite powder ("HSZ690HOA" made by TOSO Co., Ltd., Si/Al ratio= 200) was prepared, was mixed with an aqueous solution in which 145 parts of zirconium oxynitrate was dissolved in 5,000 parts of pure water, and was stirred for 30 minutes. Thereafter, it was mixed with 200 parts of 25% ammonia aqueous solution, and was further mixed for 30 iminutes. After it was aged for 12 hours, it was filtered and washed with water, and was dried in air at 110° C. for 2 hours.

The total amount of the resulting powder was mixed in 5,000 parts of 1N sulfuric acid aqueous solution, was stirred for 1 hour, was thereafter filtered, was dried in air at 110° C. for 2 hours, and was burned in air at 700° C. for 3 hours. Thus, a strongly-acidified zirconia layer was formed on a surface of the mordenite powder.

<Porous Support>

100 parts of a titania powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 houses, and was thereafter further burned at 300° C. for 2 hours, thereby preparing a titania powder with Pt loaded. The loading amount of loaded Pt was 2% by weight.

<Oxygen Releasing Material>

100 parts of a ceria-zirconia composite oxide (Zr/Ce=1/4) powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a CZS powder with Pt loaded. The loading amount of loaded Pt was 2% by weight.

<Coating>

90 parts of the mordenite powder having the strongly-acidified zirconia layer, 60 parts of the titania powder with Pt loaded, 30 parts of the CZS powder with Pt loaded, 200 parts of pure water, and 55 parts of a titania sol (solid content 35%) were mixed, and were stirred, thereby preparing a slurry. And, a honeycomb support substrate (400 cell/in2, volume 1.7 L) made from cordierite was prepared, was immersed into the slurry, was thereafter taken up therefrom to blow off the excessive slurry, was dried at 100° C. for 2 hours, and was burned at 500° C. for 2 hours, thereby obtaining a catalyst of Example No. 14. The coating amount was 180 g with respect to 1 L of the support substrate, and the loading amount of Pt was 1.8 g with respect to 1 L of the support substrate.

EXAMPLE NO. 11

<Zeolite>

It was same as Example No. 10.

<Porous Support>

Except that 100 parts of a silica powder was used instead of the titania powder, a silica powder with Pt loaded was prepared in the same manner as Example No. 10.

<Oxygen Releasing Material>

It was same as Example No. 10.

<Coating>

Except that 60 parts of the silica powder with Pt loaded was used instead of the titania powder with Pt loaded, and that 55 parts of a silica sol (solid content 35%) was used instead of the titania sol, a catalyst of Example No. 11 was prepared in the same manner as Example No. 10. The coating amount was 180 g with respect to 1 L of the support substrate, and the loading amount of Pt was 1.8 g with respect to 1 L of the support substrate.

EXAMPLE NO. 12

<Zeolite>

It was same as Example No. 10.

<Porous Support>

Except that 100 parts of a zirconia powder was used instead of the titania powder, a zirconia powder with Pt loaded was prepared in the same manner as Example No. 10.

<Oxygen Releasing Material>

It was same as Example No. 10.

<Coating>

Except that 60 parts of the zirconia powder with Pt loaded was used instead of the titania powder with Pt loaded, and that 55 parts of a zirconia sol (solid content 35%) was used instead of the titania sol, a catalyst of Example No. 12 was prepared in the same manner as Example No. 10. The coating amount was 180 g with respect to 1 L of the support substrate, and the loading amount of Pt was 1.8 g with respect to 1 L of the support substrate.

EXAMPLE NO. 12

<Zeolite>

Except that a type Y zeolite powder ("HSZ390HUA" made by TOSO Co., Ltd., Si/Al ratio=400) was used instead of the mordenite powder but in the same amount, the strongly-acidified zirconia layer was formed on a surface of the type Y zeolite powder in the same manner as Example No. 10.

<Porous Support>

It was same as Example No. 10.

<Oxygen Releasing Material>

It was same as Example No. 10.

<Coating>

Except that 90 parts of the type Y zeolite powder having the strongly-acidified zirconia layer was used instead of the mordenite powder having the strongly-acidified zirconia layer, a catalyst of Example No. 13 was prepared in the same manner as Example No. 10. The coating amount was 180 g with respect to 1 L of the support substrate, and the loading amount of Pt was 1.8 g with respect to 1 L of the support substrate.

EXAMPLE NO. 14

<Zeolite>

Except that a type ZSM-5 zeolite powder ("HSZ890HOA" made by TOSO Co., Ltd., Si/Al ratio=2,000) was used instead of the mordenite powder but in the same amount, the strongly-acidified zirconia layer was formed on a surface of the type ZSM-5 zeolite powder in the same manner as Example No. 10.

<Porous Support>

It was same as Example No. 10.

<Oxygen Releasing Material>

It was same as Example No. 10.

<Coating>

Except that 90 parts of the type ZSM-5 zeolite powder having the strongly-acidified zirconia layer was used instead of the mordenite powder having the strongly-acidified zirconia layer, a catalyst of Example No. 14 was prepared in the same manner as Example No. 14. The coating amount was 180 g with respect to 1 L of the support substrate, and the loading amount of Pt was 1.8 g with respect to 1 L of the support substrate.

EXAMPLE NO. 15

<Zeolite>

It was same as Example No. 10.

<Porous Support>

It was same as Example No. 12.

<Oxygen Releasing Material>

500 parts of a ceria-zirconia composite oxide (Zr/Ce=1/4) powder was mixed with an aqueous solution in which 300 parts of zirconium oxynitrate was solved in 2,000 parts of pure water, and was stirred for 30 minutes. Thereafter, the mixture was mixed with 300 parts of 25% ammonia aqueous solution, and was further mixed for 30 minutes. After it was aged for 12 hours, it was filtered and washed with water, and was dried in air at 110° C. for 2 hours. Thereafter, it was burned in air at 500° C. for 3 hours, thereby preparing a CZS powder having a zirconia layer.

Next, 100 parts of the CZS powder having a zirconia layer, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, sulfate-thereby preparing a Zr—CZS powder with Pt loaded. The loading amount of loaded Pt was 2% by weight.

<Coating>

90 parts of the mordenite powder with a strongly-acidified zirconia layer same as Example No. 10, 60 parts of the titania powder with Pt loaded same as Example No. 12, 30 parts of the Zr—CZS powder with Pt loaded, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Example No. 15. The coating amount was 180 g with respect to 1 L of the support substrate, and the loading amount of Pt was 1.8 g with respect to 1 L of the support substrate.

EXAMPLE NO. 16

<Zeolite>

It was same as Example No. 10.

<Porous Support>

It was same as Example No. 12.

<Oxygen Releasing Material>

500 parts of a ceria-zirconia composite oxide (Zr/Ce=1/4) powder was mixed with an aqueous solution in which 300 parts of zirconium oxynitrate was solved in 2,000 parts of pure water, and was stirred for 30 minutes. Thereafter, the mixture was mixed with 300 parts of 25% ammonia aqueous solution, and was further mixed for 30 minutes. After it was aged for 12 hours, it was filtered and washed with water, and was dried in air at 110° C. for 2 hours.

Next, the total amount of the resulting CZS powder having a zirconia layer was mixed with 5,000 parts of 1N sulfuric acid aqueous solution, was stirred for 1 hour, was filtered, was thereafter dried in air at 110° C. for 2 hours, and was further burned in air at 700° C. for 3 hours, thereby preparing a strongly-acidified CZS powder.

Next, 100 parts of the strongly-acidified CZS powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a strongly-acidified CZS powder with Pt loaded. The loading amount of loaded Pt was 2% by weight.

<Coating>

90 parts of the mordenite powder with a strongly-acidified zirconia layer same as Example No. 10, 60 parts of the titania powder with Pt loaded same as Example No. 12, 30 parts of the strongly-acidified CZS powder with Pt loaded, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Example No. 16. The coating amount was 180 g with respect to 1 L of the support substrate, and the loading amount of Pt was 1.8 g with respect to 1 L of the support substrate.

EXAMPLE NO. 17

<Zeolite>

It was same as Example No. 10.

<Porous Support>

500 parts of an active alumina (specific surface area 200 $m^2/g$) powder was mixed with an aqueous solution in which 300 parts of zirconium oxynitrate was solved in 2,000 parts of pure water, and was stirred for 30 minutes. Thereafter, the mixture was mixed with 300 parts of 25% ammonia aqueous solution, and was further mixed for 30 minutes. After it was aged for 12 hours, it was filtered and washed with water, and was dried in air at 110° C. for 2 hours. Thereafter, it was burned in air at 500° C. for 3 hours, thereby preparing an alumina powder having a zirconia layer.

Next, 100 parts of the alumina powder having a zirconia layer, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a Zr-alumina powder with Pt loaded. The loading amount of loaded Pt was 2% by weight.

<Oxygen Releasing Material>

It was same as Example No. 10.

<Coating>

90 parts of the mordenite powder with a strongly-acidified zirconia layer same as Example No. 10, 60 parts of the aforementioned Zr-alumina powder with Pt loaded, 30 parts of the CZS powder with Pt loaded same as Example No. 10, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Example No. 17. The coating amount was 180 g with respect to 1 L of the support substrate, and the loading amount of Pt was 1.8 g with respect to 1 L of the support substrate.

EXAMPLE NO. 18

<Zeolite>

It was same as Example No. 10.

<Porous Support>

500 parts of an active alumina (specific surface area 200 $m^2/g$) powder was mixed with an aqueous solution in which 300 parts of zirconium oxynitrate was solved in 2,000 parts of pure water, and was stirred for 30 minutes. Thereafter the mixture was mixed with 300 parts of 25% ammonia aqueous solution, and was further mixed for 30 minutes. After it was aged for 12 hours, it was filtered and washed with water, and was dried in air at 110° C. for 2 hours.

Next, the total amount of the resulting alumina powder having a zirconia layer was mixed with 5,000 parts of 1N sulfuric acid aqueous solution, was stirred for 1 hour, was filtered, was thereafter dried in air at 110° C. for 2 hours, and was further burned in air at 700° C. for 3 hours, thereby preparing a strongly-acidified Zr-alumina powder.

Next, 100 parts of the strongly-acidified Zr-alumina powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a strongly-acidified Zr-alumina powder with Pt loaded. The loading amount of loaded Pt was 2% by weight.

<Oxygen Releasing Material>

It was same as Example No. 10.

<Coating>

90 parts of the mordenite powder with a strongly-acidified zirconia layer same as Example No. 10, 60 parts of the aforementioned strongly-acidified Zr-alumina powder with Pt loaded, 30 parts of the CZS powder with Pt loaded same as Example No. 10, 200 parts of pure water, and 55 parts of a zirconia sol (solid content 35%) were mixed, and were stirred, thereby preparing a slurry. And, a honeycomb support substrate same as Example No. 1 was prepared, and was coated in the same manner as Example No. 10, thereby obtaining a catalyst of Example No. 18. The coating amount was 180 g with respect to 1 L of the support substrate, and the loading amount of Pt was 1.8 g with respect to 1 L of the support substrate.

EXAMPLE NO. 19

<Zeolite>

It was same as Example No. 10.

<Porous Support>

500 parts of an active alumina (specific surface area 200 $m^2/g$) powder was mixed in 3,000 parts of 1N sulfuric acid aqueous solution, was stirred for 3 hours, was thereafter filtered, and was dried in air at 110° C. for 2 hours. Thereafter, it was burned in air at 700° C. for 3 hours, thereby preparing a strongly-acidified alumina powder.

Next, 100 parts of the strongly-acidified alumina powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a strongly-acidified alumina powder with Pt loaded. The loading amount of loaded Pt was 2% by weight.

<Oxygen Releasing Material>

It was same as Example No. 10.

<Coating>

90 parts of the mordenite powder with a strongly-acidified zirconia layer same as Example No. 10, 60 parts of the aforementioned strongly-acidified alumina powder with Pt loaded, 30 parts of the CZS powder with Pt loaded same as Example No. 10, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Example No. 19. The coating amount was 180 g with respect to 1 L of the support substrate, and the loading amount of Pt was 1.8 g with respect to 1 L of the support substrate.

EXAMPLE NO. 20

100 parts of a titania powder, 100 parts of 6% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a titania powder with Pt loaded. The loading amount of loaded Pt was 3% by weight.

90 parts of the mordenite powder with a strongly-acidified zirconia layer same as Example No. 10, 60 parts of the resulting titania powder with Pt loaded, 30 parts of a ceria-zirconia composite oxide (Zr/Ce=1/4) powder, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Example No. 20. The coating amount was 180 g with respect to 1 L of the support substrate, and the loading amount of Pt was 1.8 g with respect to 1 L of the support substrate.

EXAMPLE NO. 21

100 parts of an active alumina (specific surface area 200 m$^2$/g) powder, 100 parts of 4% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing an alumina powder with Pt loaded. The loading amount of loaded Pt was 2% by weight.

90 parts of the mordenite powder with a strongly-acidified zirconia layer same as Example No. 10, 60 parts of the resulting alumina powder with Pt loaded, 30 parts of the CZS powder with Pt loaded same as Example No. 1,200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 14, thereby obtaining a catalyst of Example No. 21. The coating amount was 180 g with respect to 1 L of the support substrate, and the loading amount of Pt was 1.8 g with respect to 1 L of the support substrate.

COMPARATIVE EXAMPLE NO. 12

90 parts of a commercially available mordenite powder ("HSZ690HOA" made by TOSO Co., Ltd., Si/Al ratio=200), 60 parts of the titania powder with Pt loaded same as Example No. 10, 30 parts of the CZS powder with Pt loaded same as Example No. 10, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 14, thereby obtaining a catalyst of Comparative Example No. 12. The coating amount was 180 g with respect to 1 L of the support substrate, and the loading amount of Pt was 1.8 g with respect to 1 L of the support substrate.

COMPARATIVE EXAMPLE NO. 13

1,000 parts of a commercially available mordenite powder ("CHSZ660HOA" made by TOSO Co., Ltd., Si/Al ratio=30) was prepared, was mixed with an aqueous solution in which 145 parts of zirconium oxynitrate was solved in 5,000 parts of pure water, and was stirred for 30 minutes. Thereafter, the mixture was mixed with 200 parts of 25% ammonia aqueous solution, and was further mixed for 30 minutes. After it was aged for 12 hours, it was filtered and washed with water, and was dried in air at 110° C. for 2 hours.

The total amount of the resulting powder was mixed in 5,000 parts of 1N sulfuric acid aqueous solution, was stirred for 1 hour, was thereafter filtered, was dried in air at 110° C. for 2 hours, and was burned in air at 700° C. for 3 hours. Thus, a strongly-acidified zirconia layer was formed on a surface of the mordenite powder.

90 parts of the resulting mordenite powder with a strongly-acidified zirconia layer, 60 parts of the titania powder with Pt loaded same as Example No. 10, 30 parts of the CZS powder with Pt loaded same as Example No. 1,200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Comparative Example No. 13. The coating amount was 180 g with respect to 1 L of the support substrate, and the loading amount of Pt was 1.8 g with respect to 1 L of the support substrate.

COMPARATIVE EXAMPLE NO. 14

100 parts of the mordenite powder with a strongly-acidified zirconia layer same as Example No. 10, 100 parts of 2% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a strongly-acidified Zr-mordenite powder with Pt loaded. The loading amount of loaded Pt was 1% by weight.

Moreover, 100 parts of a titania powder, 100 parts of 2% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a titania powder with Pt loaded. The loading amount of loaded Pt was 1% by weight.

In addition, 100 parts of a ceria-zirconia composite oxide (Zr/Ce=1/4), 100 parts of 2% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours, thereby preparing a CZS powder with Pt loaded. The loading amount of loaded Pt was 1% by weight.

90 parts of the strongly-acidified Zr-mordenite powder with Pt loaded, 60 parts of the titania powder with Pt loaded, 30 parts of the CZS powder with Pt loaded, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Comparative Example No. 14. The coating amount was 180 g with respect to 1 L of the support substrate, and the loading amount of Pt was 1.8 g with respect to 1 L of the support substrate.

COMPARATIVE EXAMPLE NO. 15

90 parts of a commercially available mordenite powder ("HSZ660HOA" made by TOSO Co., Ltd., Si/Al=30), 60 parts of the titania powder with Pt loaded same as Example No. 10, 30 parts of the CZS powder with Pt loaded same as Example No. 10, 200 parts of pure water, and 55 parts of a zirconia sol (solid content 35%) were mixed, and were stirred, thereby preparing a slurry. And, a honeycomb support substrate same as Example No. 10 was prepared, and was coated in the same manner as Example No. 10, thereby obtaining a catalyst of Comparative Example No. 15. The coating amount was 180 g with respect to 1 L of the support substrate, and the loading amount of Pt was 1.8 g with respect to 1 L of the support substrate.

COMPARATIVE EXAMPLE NO. 16

Without using a zeolite, a slurry was prepared by mixing and stirring 60 parts of the titania powder with Pt loaded same as Example No. 10, 200 parts of pure water, and 55 parts of a zirconia sol (solid content 35%). And, a honeycomb support substrate same as Example No. 10 was prepared, and was coated in the same manner as Example No. 10, thereby obtaining a catalyst of Comparative Example No. 16. The coating amount was 180 g with respect to 1 L of the support substrate, and the loading amount of Pt was 1.8 g with respect to 1 L of the support substrate.

COMPARATIVE EXAMPLE NO. 17

A slurry was prepared by mixing and stirring 90 parts of the mordenite powder with a strongly-acidified zirconia layer same as Example No. 1, 60 parts of the titania powder with Pt loaded same as Example No. 10, 200 parts of pure water, and 55 parts of a zirconia sol (solid content 35%). And, a honeycomb support substrate same as Example No. 10 was prepared, and was coated in the same manner as Example No. 10, thereby obtaining a catalyst of Comparative Example No. 17. The coating amount was 180 g with respect to 1 L of the support substrate, and the loading amount of Pt was 1.8 g with respect to 1 L of the support substrate.

EVALUATION TEST

The aforementioned respective catalysts were attached to an exhaust system of a 2,400 c.c. in-line 4-cylinder diesel engine, and the diesel engine was operated at a constant revolving speed of 3,600 rpm, and a catalyst inlet gas temperature was adjusted so as to be 600° C. by the load, thereby carrying out a durability test for 25 hours.

The respective catalysts after the durability test were attached to an exhaust system of the same engine as the durability test, and the engine was operated at revolving speeds varying in the range of from 1,000 to 2,500 rpm as illustrated FIG. 7 while varying the load and adding a light oil to the exhaust gas in the range of from 300 to 1,200 ppmC, thereby measuring the conversions of the HC and the NO. The results are illustrated in FIG. 12.

Figure 12:
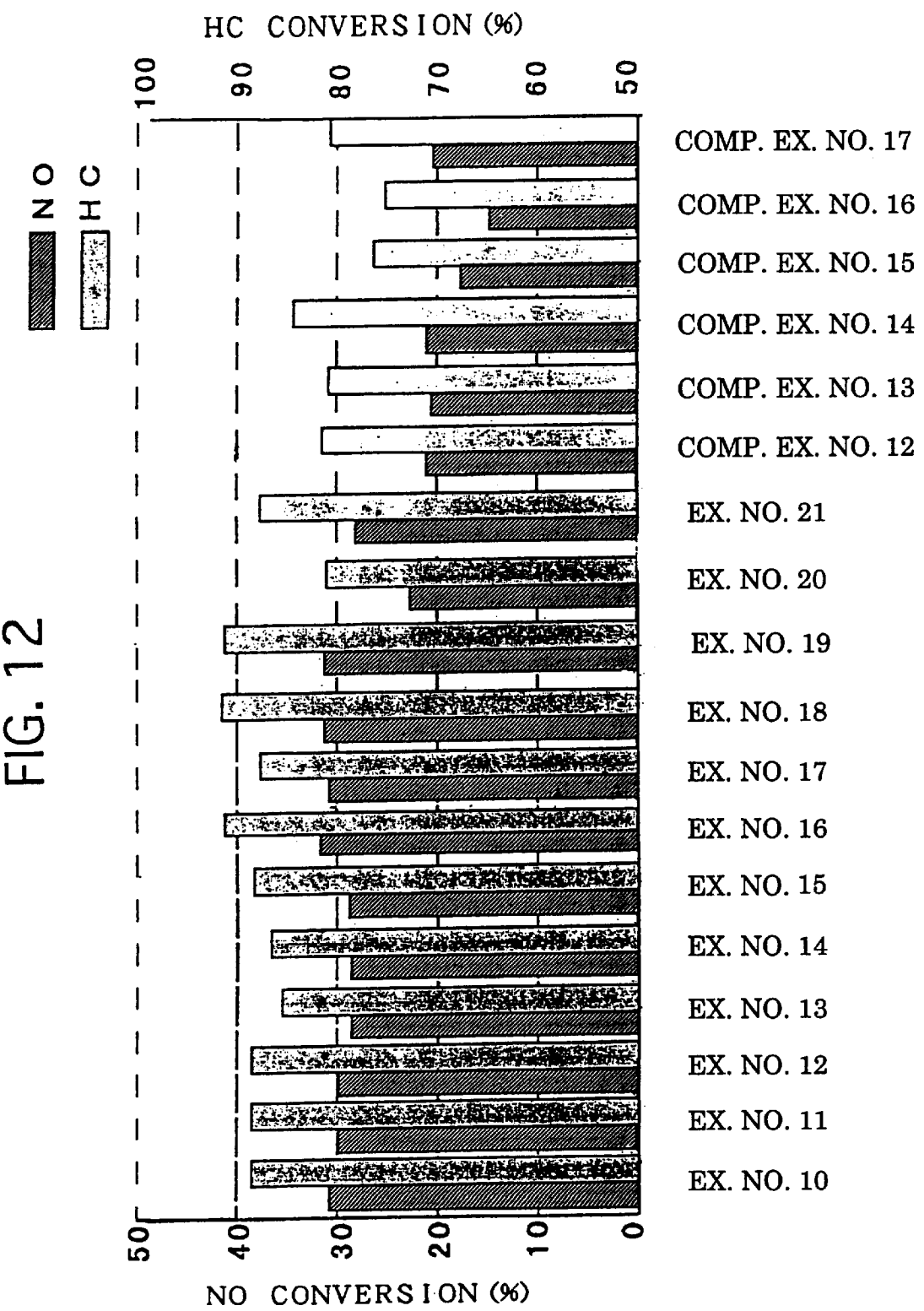
FIG. 12 is a bar graph for illustrating NO conversions and HC conversions of catalysts for purifying an exhaust gas of Example Nos. 10–21 and Comparative Example Nos. 12–17 after a durability test.

From FIG. 12, it is understood that the catalysts of the respective examples exhibited the NO conversions and HC conversions after the durability process higher than the catalysts of the comparative examples, and that they were good in terms of the durability.

When analyzing the results in more detail, the catalyst of Example No. 20 exhibited the conversions lower than Example No. 10. This difference results from the difference between the existence and the nonexistence of the loading of Pt on the oxygen releasing material, and accordingly it is understood that it is preferable to load Pt on the oxygen releasing material as well.

The catalyst of Example No. 21 exhibited the conversions lower than Example No. 10. This difference results from the types of the metallic oxide supports, and accordingly it is understood that the titania is preferred over the alumina.

When comparing Example No. 15 with Example No. 16, Example No. 16 exhibited the higher conversions. Namely, it is preferable to strongly acidify the coating layer of the oxygen releasing material. By comparing Example No. 17 with Example No. 18, it is preferable to strongly acidify the porous support as well. And, in Comparative Example 12, since the zeolite is not strongly acidified, it exhibited the conversions lower than Example No. 10. In Comparative Example No. 13 and Comparative Example No. 15, since the Si/Al ratio of the zeolite is as low as 30, they exhibited the low conversions. In Comparative Example No. 14, since Pt is loaded on the zeolite, it exhibited the low conversions. Note that in Comparative Example No. 13 and Comparative Example No. 15, Comparative Example No. 13 exhibited the higher conversions. This results from the difference between the existence and the nonexistence of the zirconia coating layer of the zeolite, and accordingly it is understood that it is preferable to form the coating layer.

Moreover, in Comparative Example No. 16, since it did not have the zeolite and the oxygen releasing material, it exhibited the considerably low conversions, in Comparative Example No. 17, since it did not have the oxygen releasing material, it exhibited the conversions lower than Example No. 10.

Namely, the differences of these effects result form the differences of the arrangements of the supports, it is apparent that the durability of the $NO_x$ conversion ability is improved by employing the arrangements of the fourth catalyst.

<Mode of a Fifth Series>

In this mode, examples of the fifth catalyst and their performances are verified.

EXAMPLE NO. 22

<Formation of Strongly-Acidified Oxide Layer>1,000 parts of a commercially available mordenite powder ("HSZ690HOA" made by TOSO Co., Ltd., Si/Al ratio=200) was prepared, was mixed in an aqueous solution in which 145 parts of zirconium oxynitrate was solved in 5,000 parts of pure water, and was stirred for 30 minutes. Thereafter, the mixture was mixed with 200 parts of 25% ammonia aqueous solution, and was further mixed for 30 minutes. After it was aged for 12 hours, it was filtered and washed with water, and was dried in air at 110° C. for 2 hours.

The total amount of the resulting powder was mixed in 5,000 parts of 1N sulfuric acid aqueous solution, was stirred for 1 hour, was thereafter filtered, was dried in air at 110° C. for 2 hours, and was further burned in air at 700° C. for 3 hours. Thus, a strongly-acidified zirconia layer was formed on a surface of the mordenite powder.

<Loading of Noble Metal>

100 parts of the mordenite powder with a strongly-acidified zirconia layer obtained as aforementioned, 100 parts of 1% by weight hexaammine platinum hydroxide salt aqueous solution, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours. The loading amount of Pt loaded thereby was 1% by weight.
<Coating>

150 parts of the mordenite powder with a strongly-acidified zirconia layer with Pt loaded, 200 parts of pure water, and 55 parts of a silica sol (solid content 35%) were mixed, and were stirred, thereby preparing a slurry. And, a honeycomb support substrate (volume 1.5 L) made from cordierite was prepared, was immersed into the slurry, was thereafter taken up therefrom to blow off the excessive slurry, was dried at 100° C. for 2 hours, and was thereafter burned at 500° C. for 2 hours, thereby obtaining a catalyst of Example No. 22. The coating amount was 150 g with respect to 1 L of the support substrate, and the loading amount of Pt was 1.5 g with respect to 1 L of the support substrate.

EXAMPLE NO. 23

Except that oxynitrate titanium was used by 145 parts instead of the oxynitrate zirconium, a strongly-acidified titania layer was formed on a surface of the mordenite powder in the same manner as Example No. 22.

This mordenite powder with a strongly-acidified titania layer was used, the noble metal was loaded and the coating was carried out in the same manner as Example No. 22, thereby preparing a catalyst of Example No. 23. The coating amount was 150 g with respect to 1 L of the support substrate, and the loading amount of Pt was 1.5 g with respect to 1 L of the support substrate.

EXAMPLE NO. 24
<Formation of Strongly-Acidified Oxide Layer>

150 parts of a commercially available mordenite powder ("HSZ690HOA" made by TOSO Co., Ltd., Si/Al ratio=200) and 33 parts of a zirconia sol having a solid content of 30% by weight were mixed, and were stirred for 30 minutes. Thereafter, the mixture was kept being heated at 100° C. to evaporate the water content to dry, was dried at 120° C. for 2 hours, and was thereafter further burned at 300° C. for 2 hours.

1,000 parts of the resulting powder was mixed in 5,000 parts of 1N sulfuric acid, was stirred for 1 hour, was thereafter filtered, was dried in air at 110° C. for 2 hours, and was further burned in air at 700° C. for 3 hours. Thus, a strongly-acidified zirconia layer was formed on a surface of the mordenite powder.

This mordenite powder with a strongly-acidified zirconia layer was used, the noble metal was loaded and the coating was carried out in the same manner as Example No. 22, thereby preparing a catalyst of Example No. 24. The coating amount was 150 g with respect to 1 L of the support substrate, and the loading amount of Pt was 1.5 g with respect to 1 L of the support substrate.

EXAMPLE NO. 25
<Formation of Strongly-Acidified Oxide Layer>

150 parts of a commercially available mordenite powder ("HSZ690HOA" made by TOSO Co., Ltd., Si/Al ratio=200) and 33 parts of a titania sol having a solid content of 30% by weight were mixed, and were stirred for 30 minutes. Thereafter, the mixture was kept being heated at 100° C. to evaporate the water content to dry, was dried at 120° C. for 2 hours, and was thereafter further burned at 300° C. for 2 hours.

1,000 parts of the resulting powder was mixed in 5,000 parts of 1N sulfuric acid, was stirred for 1 hour, was thereafter filtered, was dried in air at 110° C. for 2 hours, and was further burned in air at 700° C. for 3 hours. Thus, a strongly-acidified titania layer was formed on a surface of the mordenite powder.

This mordenite powder with a strongly-acidified titania layer was used, the noble metal was loaded and the coating was carried out in the same manner as Example No. 22, thereby preparing a catalyst of Example No. 25. The coating amount was 150 g with respect to 1 L of the support substrate, and the loading amount of Pt was 1.5 g with respect to 1 L of the support substrate.

EXAMPLE NO. 26
<Formation of Strongly-Acidified Oxide Layer>

150 parts of a commercially available mordenite powder ("HSZ690HOA" made by TOSO Co., Ltd., Si/Al ratio=200) and 33 parts of a silica sol having a solid content of 30% by weight were mixed, and were stirred for 30 minutes. Thereafter, the mixture was kept being heated at 100° C. to evaporate the water content to dry, was dried at 120° C. for 2 hours, and was thereafter further burned at 300° C. for 2 hours.

1,000 parts of the resulting powder was mixed in 5,000 parts of 1N sulfuric acid, was stirred for 1 hour, was thereafter filtered, was dried in air at 110° C. for 2 hours, and was further burned in air at 700° C. for 3 hours. Thus, a strongly-acidified silica layer was formed on a surface of the mordenite powder.

This mordenite powder with a strongly-acidified silica layer was used, the noble metal was loaded and the coating was carried out in the same manner as Example No. 22, thereby preparing a catalyst of Example No. 26. The coating amount was 150 g with respect to 1 L of the support substrate, and the loading amount of Pt was 1.5 g with respect to 1 L of the support substrate.

EXAMPLE NO. 27

Except that a type Y zeolite powder ("HSZ390HUA" made by TOSO, Si/Al ratio=400) was used by the same amount instead of the mordenite powder, a strongly-acidified zirconia layer was formed on a surface of the type Y zeolite powder in the same manner as Example No. 22.

This type Y zeolite powder with a strongly-acidified zirconia layer was used, the noble metal was loaded and the coating was carried out in the same manner as Example No. 22, thereby preparing a catalyst of Example No. 27. The coating amount was 150 g with respect to 1 L of the support substrate, and the loading amount of Pt was 1.5 g with respect to 1 L of the support substrate.

EXAMPLE NO. 28

Except that a type ZSM-5 zeolite powder ("HSZ890HOA" made by TOSO, Si/Al ratio=2,000) was used by the same amount instead of the mordenite powder, a strongly-acidified zirconia layer was formed on a surface of the type ZSM-5 zeolite powder in the same manner as Example No. 22.

This type ZSM-5 zeolite powder with a strongly-acidified zirconia layer was used, the noble metal was loaded and the coating was carried out in the same manner as Example No. 22, thereby preparing a catalyst of Example No. 28. The coating amount was 150 g with respect to 1 L of the support substrate, and the loading amount of Pt was 1.5 g with respect to 1 L of the support substrate.

COMPARATIVE EXAMPLE NO. 18

100 parts of the mordenite powder same as Example No. 22, 100 parts of 1% by weight hexaammine platinum hydroxide salt aqueous solution, and 200 parts pure water were mixed, were stirred for 1 hour, were kept being heated at 100° C. to evaporate the water content to dry, were dried at 120° C. for 2 hours, and were thereafter further burned at 300° C. for 2 hours. Thus, a mordenite powder with Pt loaded was prepared.

Next, 150 parts of the mordenite powder with Pt loaded, 200 parts of pure water, and 55 parts of a silica sol (solid content 35%) were mixed, and were stirred, thereby preparing a slurry. And, a honeycomb support substrate (volume 1.5 L) made from cordierite was prepared, was immersed into the slurry, was thereafter taken up therefrom to blow off the excessive slurry, was dried at 100° C. for 2 hours, and was thereafter burned at 500° C. for 2 hours, thereby obtaining a catalyst of Comparative Example No. 18. The coating amount was 150 g with respect to 1 L of the support substrate, and the loading amount of Pt was 1.5 g with respect to 1 L of the support substrate.

COMPARATIVE EXAMPLE NO. 19

100 parts of a commercially available mordenite powder ("HSZ660HOA" made by TOSO Co., Ltd., Si/Al ratio=30), 100 parts of 1% by weight hexaammine platinum hydroxide salt aqueous solution, and 200 parts pure water were mixed, were stirred for 1 hour, were kept being heated at 100° C. to evaporate the water content to dry, were dried at 120° C. for 2 hours, and were thereafter further burned at 300° C. for 2 hours. Thus, a mordenite powder with Pt loaded was prepared.

Next, 150 parts of the mordenite powder with Pt loaded, 200 parts of pure water, and 55 parts of a silica sol (solid content 35%) were mixed, and were stirred, thereby preparing a slurry. And, a honeycomb support substrate (volume 1.5 L) made from cordierite was prepared, was immersed into the slurry, was thereafter taken up therefrom to blow off the excessive slurry, was dried at 100° C. for 2 hours, and was thereafter burned at 500° C. for 2 hours, thereby obtaining a catalyst of Comparative Example No. 19. The coating amount was 150 g with respect to 1 L of the support substrate, and the loading amount of Pt was 1.5 g with respect to 1 L of the support substrate.

COMPARATIVE EXAMPLE NO. 20

Except that a mordenite powder ("HSZ660HOA" made by TOSO, Si/Al ratio=30) was used as the zeolite powder by the same amount, a strongly-acidified zirconia layer was formed on a surface of the mordenite powder in the same manner as Example No. 22.

This mordenite powder with a strongly-acidified zirconia layer was used, the noble metal was loaded and the coating was carried out in the same manner as Example No. 22, thereby preparing a catalyst of Comparative Example No. 20. The coating amount was 150 g with respect to 1 L of the support substrate, and the loading amount of Pt was 1.5 g with respect to 1 L of the support substrate.

EVALUATION TEST

The aforementioned respective catalysts were attached to an exhaust system of a 2,400 c.c. in-line 4-cylinder diesel engine, and the diesel engine was operated at a constant revolving speed of 3,600 rpm, and a catalyst inlet gas temperature was adjusted so as to be 600° C. by the load, thereby carrying out a durability test for 25 hours.

The respective catalysts after the durability test were attached to an exhaust system of the same engine as the durability test, and the engine was operated at revolving speeds varying in the range of from 1,000 to 2,500 rpm as illustrated FIG. 7 while varying the load and adding a light oil to the exhaust gas in the range of from 300 to 1,200 ppmC, thereby measuring the maximum conversions of the HC and the NO. The results are illustrated in FIG. 13.

Figure 13:
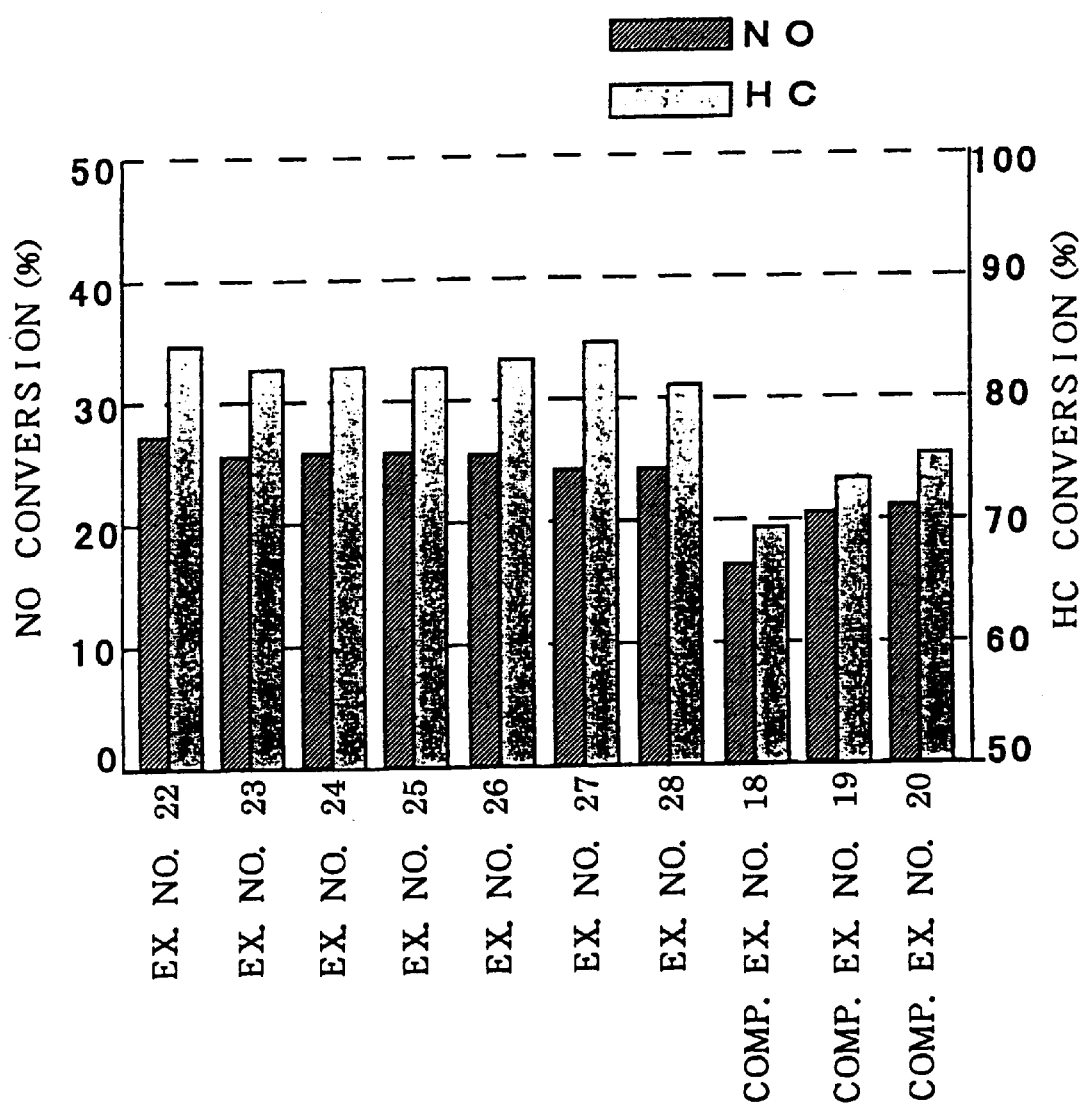
FIG. 13 is a bar graph for illustrating NO conversions and HC conversions of catalysts for purifying an exhaust gas of Example Nos. 22–28 and Comparative Example Nos. 18–20 after a durability test.

From FIG. 13, the catalysts of the respective examples exhibited better results than the comparative examples in terms of both of the HC conversions and the NO conversions. And, the catalysts of Example Nos. 22–28 exhibited remarkably better conversions than Comparative Example No. 18, and accordingly it is understood that the presence of the strongly-acidified oxide layers contributed to the improvements of the conversions. Moreover, in the catalysts of the respective examples, there were substantially no difference between the purifying performances before and after the durability test, and accordingly they were good in terms of the durability as well.

Whilst, in the catalyst of Comparative Example No. 20, since it had a strongly-acidified oxide layer, it exhibited higher conversions compared with the other comparative examples, but the conversions were low compared with the examples. For instance, considering that the catalyst of Comparative Example No. 20 exhibited slightly higher conversions than Example No. 22, in the catalyst of Comparative Example No. 20, since the Si/Al ratio of the zeolite was small, it is believed that the caulking arose during the durability test and the granular growth occurred in Pt by the elimination of Al so that the considerable degradation of the purifying performance happened.

<Mode of a Sixth Series>

This mode is positioned as a reference example of the present invention, and modified versions of the porous support in the fourth catalyst and their performances are verified.

REFERENCE EXAMPLE NO. 1

Into 1,000 parts of isopropyl alcohol, 100 parts of a γ-alumina powder was immersed, while stirring the mixture, 285 parts of titanium isopropoxide ($Ti[OCH(CH_3)_2]_4$) was dropped, and was stirred. While stirring the mixture, 150 parts of pure water was further dropped to cause hydrolysis, thereby forming a precipitate. And, the alcohol content was evaporated, and the precipitate was dried in air at 110° C. for 2 hours.

120 parts of a support, which comprised the alumina powder with a titania layer obtained as aforementioned, 100 parts of a hexaammine platinum hydroxide salt aqueous solution, which contained Pt in an amount of 2% by weight, and 200 parts of pure water were mixed, and were stirred for 1 hour. Thereafter, the mixture was kept being heated at 100° C. to evaporate the water content to dry, was dried at 120° C. for 2 hours, and was thereafter further burned at 300° C. for 2 hours. The loading amount of Pt loaded thereby was 2 g with respect to 120 g of the support.

150 parts of the alumina powder with a titania layer with Pt loaded prepared as aforementioned, 200 parts of pure water, and 55 parts of a $TiO_2$ sol (solid content 35%) were mixed, and were stirred, thereby preparing a slurry. And, a honeycomb support substrate (volume 1.5 L) made from cordierite was prepared, was immersed into the slurry, was thereafter taken up therefrom to blow off the excessive slurry, was dried at 100° C. for 2 hours, and was thereafter burned at 500° C. for 2 hours, thereby obtaining a catalyst of Reference Example No. 1. The coating amount was 120 g with respect to 1 L of the support substrate, and the loading amount of Pt was 2 g with respect to 1 L of the support substrate. Moreover, the composition ratio of the titania and alumina in the support was Al/Ti=2/1 by molar ratio.

REFERENCE ERXAMPLE NO. 2

Into 1,000 parts of isopropyl alcohol, 100 parts of a γ-alumina powder was immersed, while stirring the mixture, 10 parts of orthosilicate tetraethyl $((C_2H_5O)_4Si)_2$ was dropped, and was stirred. While stirring the mixture, 150 parts of pure water was further dropped to cause hydrolysis, thereby forming a precipitate. And, the alcohol content was evaporated, and the precipitate was dried in air at 110° C. for 2 hours.

Except that a support, which comprised the resulting alumina powder with a silica layer, was used, Pt was loaded in the same manner as Reference Example No. 1, and the resulting slurry was coated similarly, thereby preparing a catalyst of Reference Example No. 2. The coating amount was 120 g with respect to 1 L of the support substrate, and the loading amount of Pt was 2 g with respect to 1 L of the support substrate.

REFERENCE EXAMPLE NO. 3

Into 1,000 parts of isopropyl alcohol, 100 parts of a γ-alumina powder was immersed, while stirring the mixture, 90 parts of zirconium n butoxide $(Zr(OC_4H_9)_4)_3$ was dropped, and was stirred. While stirring the mixture, 150 parts of pure water was further dropped to cause hydrolysis, thereby forming a precipitate. And, the alcohol content was evaporated, and the precipitate was dried in air at 110° C. for 2 hours.

Except that a support, which comprised the resulting alumina powder with a zirconia layer, was used, Pt was loaded in the same manner as Reference Example No. 1, and the resulting slurry was coated similarly, thereby preparing a catalyst of Reference Example No. 3. The coating amount was 120 g with respect to 1 L of the support substrate, and the loading amount of Pt was 2 g with respect to 1 L of the support substrate.

REFERENCE EXAMPLE NO. 4

Except that a mixed powder support, which comprised 85 parts of a γ-alumina powder and 65 parts of a titania powder, was used instead of the support, which comprised the alumina powder with a titania layer, Pt was loaded in the same manner as Reference Example No. 1, and the resulting slurry was coated similarly, thereby preparing a catalyst of Reference Example No. 4. The coating amount was 120 g with respect to 1 L of the support substrate, and the loading amount of Pt was 2 g with respect to 1 L of the support substrate.

REFERENCE EXAMPLE NO. 5

Except that a titania powder was used instead of the support, which comprised the alumina powder with a titania layer, Pt was loaded in the same manner as Reference Example No. 1, and the resulting slurry was coated similarly, thereby preparing a catalyst of Reference Example No. 5. The coating amount was 120 g with respect to 1 L of the support substrate, and the loading amount of Pt was 2 g with respect to 1 L of the support substrate.

REFERENCE EXAMPLE NO. 6

Except that a γ-alumina powder was used instead of the support, which comprised the alumina powder with a titania layer, Pt was loaded in the same manner as Reference Example No. 1, and the resulting slurry was coated similarly, thereby preparing a catalyst of Reference Example No. 6. The coating amount was 120 g with respect to 1 L of the support substrate, and the loading amount of Pt was 2 g with respect to 1 L of the support substrate.

REFERENCE EXAMPLE NO. 7

Except that a silica powder was used instead of the support, which comprised the alumina powder with a titania layer, Pt was loaded in the same manner as Reference Example No. 1, and the resulting slurry was coated similarly, thereby preparing a catalyst of Reference Example No. 7. The coating amount was 120 g with respect to 1 L of the support substrate, and the loading amount of Pt was 2 g with respect to 1 L of the support substrate.

REFERENCE EXAMPLE NO. 8

Except that a zirconia powder was used instead of the support, which comprised the alumina powder with a titania layer, Pt was loaded in the same manner as Reference Example No. 1, and the resulting slurry was coated similarly, thereby preparing a catalyst of Reference Example No. 8. The coating amount was 120 g with respect to 1 L of the support substrate, and the loading amount of Pt was 2 g with respect to 1 L of the support substrate.

EXAMINATION AND EVALUATION

[TABLE 8]

| | NO (ppm) | CO (ppm) | $CO_2$ (%) | $O_2$ (%) | $C_6H_{14}$ (ppm) | $C_3H_6$ (ppm) | $SO_2$ (ppm) | $N_2$ |
|---|---|---|---|---|---|---|---|---|
| E/G[*1] | 250 | 150 | 6.7 | 10 | 2,000 | — | — | Balance |
| D/G[*2] | 250 | 150 | 6.7 | 10 | — | 1,000 | 300 | Balance |

[*1]denotes an "Evaluation Gas".
[*2]denotes a "Durability Gas".

The aforementioned respective catalysts were measured for the maximum values of the initial $NO_x$ conversions by using the evaluation model gas set forth in Table 8 under the condition of a space velocity of 200,000/h. Moreover, a durability test was carried out in which the durability model gas set forth in Table 8 was flowed through the respective catalysts at 650° C. for 3 hours, with regard to the respective catalysts after the durability test, the maximum values of the $NO_x$ conversions after the durability test were measured in the same manner as the measurement of the initial $NO_x$ conversions. The respective results are shown in Table 9 and FIG. 14.

Figure 15:
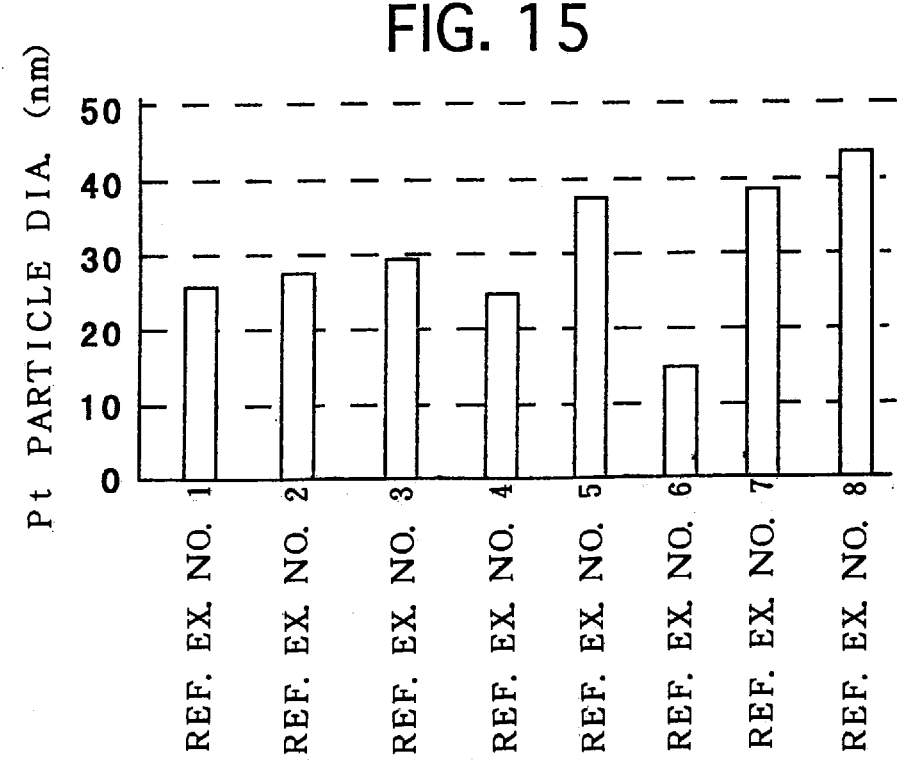
FIG. 15 is a bar graph for illustrating Pt particle diameters of Reference Example Nos. 1–8 after a durability test.
Figure 16:
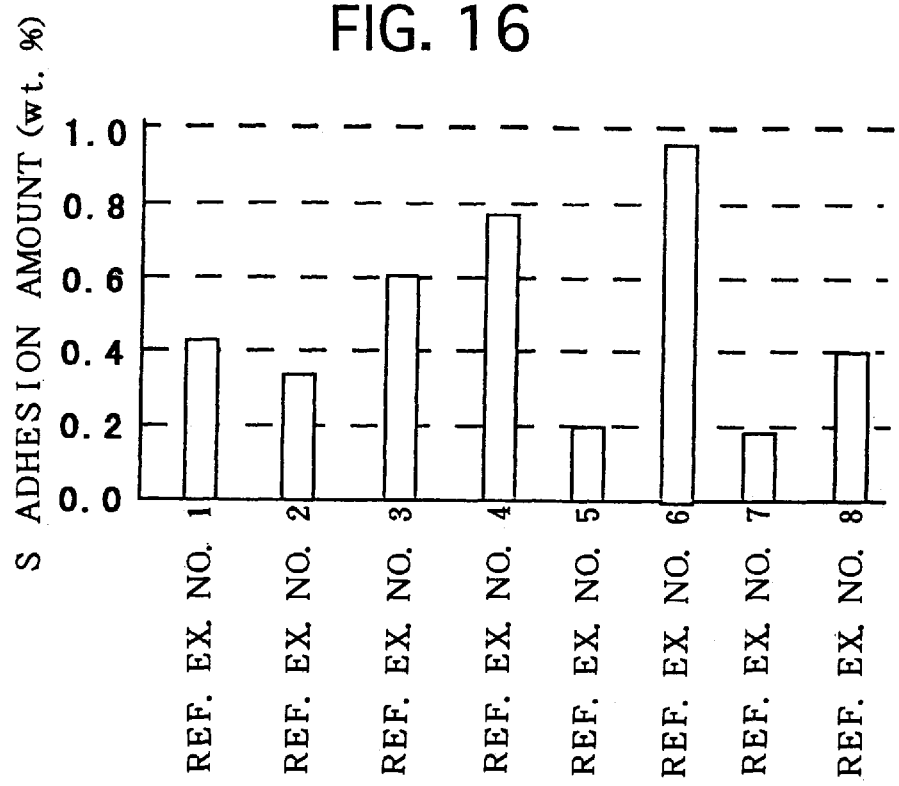
FIG. 16 is a bar graph for illustrating sulfur adhesion amounts of Reference Example Nos. 1–8 after a durability test.

Further, with regard to the respective catalysts after the durability test, the particle diameters of loaded Pt were measured by the CO pulse method, and the results are illustrated in FIG. 15, and in addition the amounts of adhered sulfur were measured by the combustion iodine titration method, and the results are illustrated in FIG. 16.

TABLE 9

| | Support | NO$_x$ Conversion Max. Value | |
|---|---|---|---|
| | | I*[1] (%) | A/D/T*[2] (%) |
| Reference Example No. 1 | TiO$_2$ on Surface of Al$_2$O$_3$ | 32 | 34 |
| Reference Example No. 2 | SiO$_2$ on Surface of Al$_2$O$_3$ | 32 | 31 |
| Reference Example No. 3 | ZrO$_2$ on Surface of Al$_2$O$_3$ | 30 | 29 |
| Reference Example No. 4 | Mixture of TiO$_2$ and Al$_2$O$_3$ | 32 | 32 |
| Reference Example No. 5 | TiO$_2$ | 31 | 29 |
| Reference Example No. 6 | Al$_2$O$_3$ | 32 | 34 |
| Reference Example No. 7 | SiO$_2$ | 33 | 27 |
| Reference Example No. 8 | ZrO$_2$ | 27 | 26 |

*1 denotes "Initial".
*2 denotes "After Durability Test".

<Comparison between Reference Example No. 1 and Reference Example Nos. 4–6>

Figure 14:
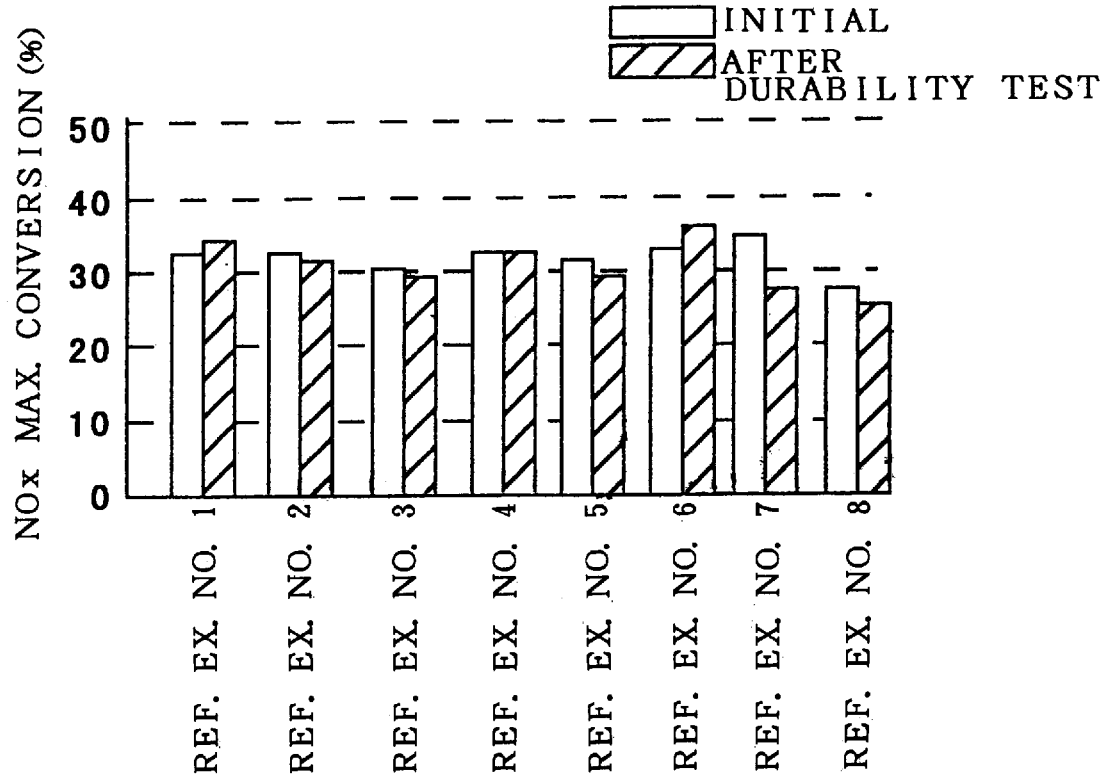
FIG. 14 is a bar graph for illustrating maximum $NO_x$ conversions of catalysts for purifying an exhaust gas of Reference Example Nos. 1–8.

From FIG. 14 and Table 9, the catalysts of Reference Example Nos. 4–5 exhibited lower NO$_x$ conversions after the durability test than the catalyst of Reference Example No. 6. However, the catalyst of Reference Example No. 1 exhibited an NO$_x$ conversion after the durability test equivalent to that of the catalyst of Reference Example No. 6, and accordingly it is apparent that a high NO$_x$ purifying activity is exhibited after the durability test by employing a support in which alumina is coated with titania.

Moreover, from FIG. 15, it is understood that the catalyst of Reference Example No. 1 was suppressed more than the catalyst of Reference Example No. 5 in terms of the granular growth of Pt, and it is understood that the catalyst of Example No. 1, in which alumina was coated with titania, was less likely to cause the granular growth of Pt than the support of Reference Example No. 5, which comprised titania only.

Further, From FIG. 16, it is understood that, although the catalyst of Reference Example No. 1 had an amount of adsorbed sulfur more than the catalyst of Reference Example No. 5, the amount was remarkably less than the catalyst of Reference Example No. 6 which used the support which comprised alumina only, and that the amount was further less than the mixture support of Reference Example No. 4. Namely, the sulfur poisoning is suppressed more in the support, in which alumina is coated with titania, than the support, in which alumina and titania are mixed.

From the foregoing results, the following are apparent: by making the catalyst of Reference Example No. 1 in which alumina is coated with titania and in which Pt is loaded on titania, the granular growth of Pt is suppressed, and the sulfur poisoning is suppressed, while utilizing the respective advantages of an alumina support and a titania support, the respective disadvantages are improved, and a high NO$_x$ purifying ability is exhibited even after the durability test.
<Comparison between Reference Example No. 2 and Reference Example No. 7, Comparison between Reference Example No. 3 and Reference Example No. 8>

The catalysts of Reference Example Nos. 7 and 8 exhibited NO$_x$ purirying abilities after the durability test lower than the catalyst of Reference Example No. 3. However, the catalysts of Reference Example Nos. 2 and 3 exhibited high NO$_x$ purifying abilities after the durability test, and accordingly it is apparent that a high NO$_x$ purifying ability is exhibited by employing a support in which alumina is coated with silica or zirconia.

Moreover, from FIG. 15, it is understood that the catalysts of Reference Example Nos. 2 and 3 are more suppressed than the catalysts of Reference Example Nos. 7 and 8 in terms of the granular growth of Pt, and similarly to the case of titania, it is understood that Pt is less likely to grow granularly in the supports of Reference Example Nos. 2 and 3, in which alumina is coated with silica or zirconia, than in a silica support or a zirconia support.

Further, from FIG. 16, the catalysts of Reference Example Nos. 2 and 3 had amounts of adsorbed sulfur more than the catalysts of Reference Example Nos. 7 and 8, however, the amounts were remarkably less than the catalyst of Reference Example No. 6 which used the support which comprised alumina only.

From the foregoing results, the following are apparent: by making the catalysts of Reference Example Nos. 2 and 3 which use the supports in which alumina is coated with silica or zirconia, similarly to the catalyst of Reference Example No. 1, the granular growth of Pt is suppressed, and the sulfur poisoning is suppressed, and a high NO$_x$ purifying ability is exhibited even after the durability test.

REFERENCE EXAMPLE NO. 9

In order to find out an optimum value of the titania coating amount, except that the mixing amounts of γ-alumina and titanium isopropoxide were varied variously, alumina powders, which had titania layers whose coating amounts differed, were prepared in the same manner as Reference Example No. 1. And, similarly to Reference Example No. 1, Pt was loaded on the alumina powders, and the alumina powders were made into slurries, and thereafter the slurries were coated on the honeycomb supports, thereby preparing respective catalysts.

In the supports of the respective catalysts, the composition of titania and alumina ratios were as follows: Al/Ti=1/2, 1/1, 2/1, 3/1 and 9/1 by molar ratio.

Figure 17:
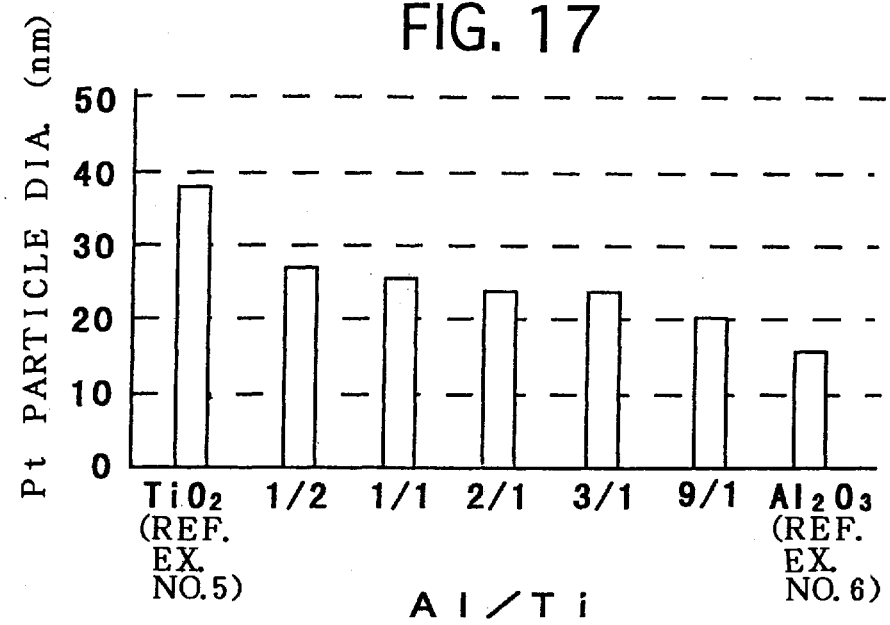
FIG. 17 is a bar graph for illustrating relationships between Al/Ti ratios and Pt particle diameters after a durability test.
Figure 18:
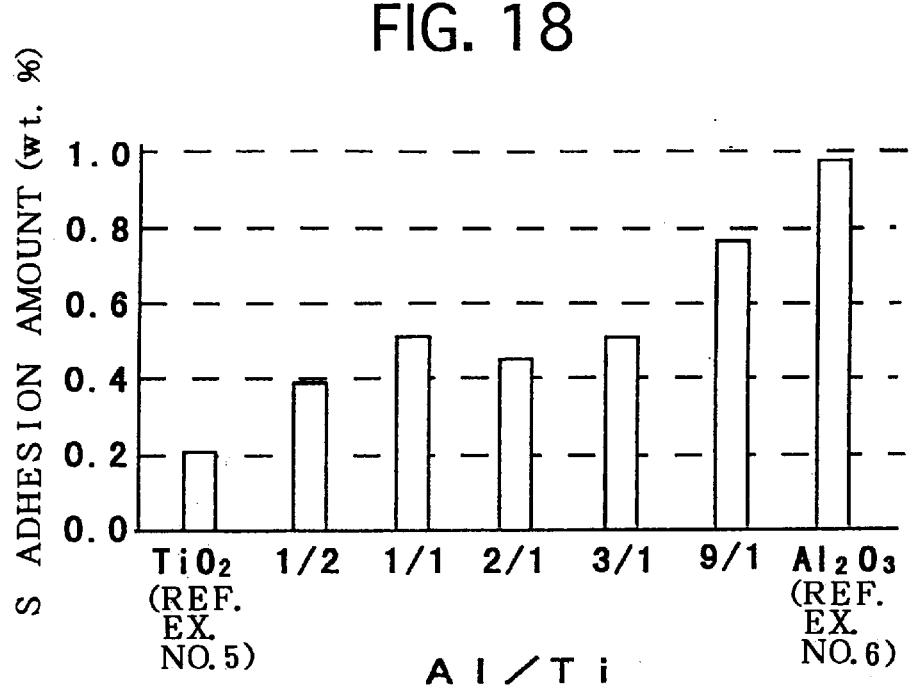
FIG. 18 is a bar graph for illustrating relationships between Al/Ti ratios and sulfur adhesion amounts after a durability test.

The respective catalysts were subjected to the durability test in the same manner as Reference Example No. 1, were measured for the particle diameters of Pt and the sulfur adhesion amounts after the durability test, and the results are illustrated in FIG. 17 and FIG. 18. Note that, in FIG. 17 and FIG. 18, the test results of the catalysts of Reference Example No. 2 and Reference Example No. 3 are also illustrated.

From FIG. 17 and FIG. 18, it is understood that, when the alumina amount increases relatively, the amount of the adhered sulfur increases because the coating amount of the titania decreases, and that, when the titania amount increases relatively, the granular growth of Pt is likely to occur. Therefore, it is preferred that Al/Ti falls in the range of Al/Ti=1/1–3/1 in view of the balance between both of the performances.

REFERENCE EXAMPLE NO. 10

100 parts of the support, which comprised the alumina powder having a titania layer which was prepared in the midway process of Reference Example No. 1, was mixed with 500 parts of 1N sulfuric acid aqueous solution, was stirred for 1 hour, was thereafter filtered, was dried in air at 110° C. for 2 hours, and was further burned in air at 700° C. for 3 hours. Thus, a strongly-acidified titania layer was formed on a surface of the alumina.

Except that the resulting support was used, Pt was loaded in the same manner as Reference Example No. 1, and the resulting slurry was coated similarly, thereby preparing a catalyst of Reference Example No. 10. The coating amount was 120 g with respect to 1 L of the support substrate, and the loading amount of Pt was 2 g with respect to 1 L of support substrate.

REFERENCE EXAMPLE NO. 11

100 parts of the support, which comprised the alumina powder having a silica layer which was prepared in the midway process of Reference Example No. 2, was mixed with 500 parts of 1N sulfuric acid aqueous solution, was stirred for 1 hour, was thereafter filtered, was dried in air at 110° C. for 2 hours, and was further burned in air at 700° C. for 3 hours. Thus, a strongly-acidified silica layer was formed on a surface of the alumina.

Except that the resulting support was used, Pt was loaded in the same manner as Reference Example No. 1, and the resulting slurry was coated similarly, thereby preparing a catalyst of Reference Example No. 11. The coating amount was 120 g with respect to 1 L of the support substrate, and the loading amount of Pt was 2 g with respect to 1 L of the support substrate.

REFERENCE EXAMPLE NO. 12

100 parts of the support, which comprised the alumina powder having a zirconia layer which was prepared in the midway process of Reference Example No. 3, was mixed with 500 parts of 1N sulfuric acid aqueous solution, was stirred for 1 hour, was thereafter filtered, was dried in air at 110° C. for 2 hours, and was further burned in air at 700° C. for 3 hours. Thus, a strongly-acidified zirconia layer was formed on a surface of the alumina.

Except that the resulting support was used, Pt was loaded in the same manner as Reference Example No. 1, and the resulting slurry was coated similarly, thereby preparing a catalyst of Reference Example No. 12. The coating amount was 120 g with respect to 1 L of the support substrate, and the loading amount of Pt was 2 g with respect to 1 L of the support substrate.

EXAMINATION AND EVALUATION

With regard to the catalysts of Reference Example Nos. 10–12, the maximum values of the initial $NO_x$ conversions and the maximum values of the $NO_x$ conversions after the durability process were measured under the identical conditions with Reference Example Nos. 1–3. The results are set forth in Table 10 together with the results of the catalysts of Reference Example Nos. 1–3.

Figure 19:
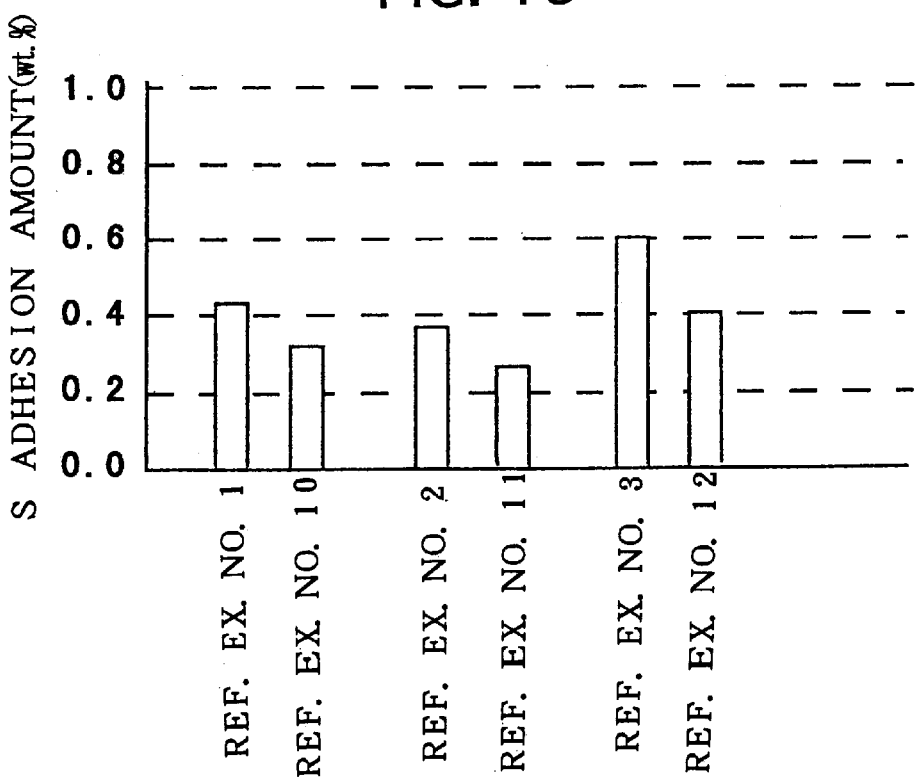
FIG. 19 is a bar graph for illustrating sulfur adhesion amounts of catalysts for purifying an exhaust gas of Reference Example Nos. 1–3 and 10–12 after a durability test.

Moreover, with regard to the catalysts after the durability test, the amounts of the adhered sulfur were measured similarly to Reference Example Nos. 1–3, and the results are illustrated in FIG. 19.

TABLE 10

| | | $NO_x$ Conversion Max. Value | |
|---|---|---|---|
| | Support | I*[1] (%) | A/D/T*[2] (%) |
| Reference Example No. 1 | $TiO_2$ on Surface of $Al_2O_3$ | 32 | 34 |
| Reference Example No. 10 | Strongly-Acidified $TiO_2$ on Surface of $Al_2O_3$ | 35 | 35 |
| Reference Example No. 2 | $SiO_2$ on Surface of $Al_2O_3$ | 32 | 31 |
| Reference Example No. 11 | Strongly-Acidified $SiO_2$ on Surface of $Al_2O_3$ | 34 | 33 |
| Reference Example No. 3 | $ZrO_2$ on Surface of $Al_2O_3$ | 30 | 29 |
| Reference Example No. 12 | Strongly-Acidified $ZrO_2$ on Surface of $Al_2O_3$ | 32 | 30 |

*1 denote "Initial".
*2 denotes "After Durability Test".

From Table 10, it is understood that the initial and the after-durability-test $NO_x$ purifying abilities are improved by strongly acidifying the titania layer, the silica layer or the zirconia layer. Moreover, from FIG. 19, it is understood that the sulfur adhesion amount is reduced by strongly acidifying.

Namely, it is believed that by strongly acidifying the titania layer, the silica layer or the zirconia layer, the sulfur poisoning is furthermore suppressed, and thereby the $NO_x$ purifying performance is furthermore improved.

INDUSTRIAL APPLICABILITY

Namely, in accordance with the method of purifying an exhaust gas of the present invention and the catalyst for purifying an exhaust gas thereof, since the $NO_x$ in an oxygen-rich exhaust gas can be purified efficiently, and the durability of the $NO_x$ purifying performance is extremely good, it is possible to stably purify the $NO_x$ for a long period of time.

And, even in such a case as immediately after driving is started or at the deceleration where the exhaust gas temperature is low, the HC and $NO_x$ can be removed efficiently, and the $NO_x$ in an exhaust gas, such as an exhaust gas emitted from a diesel engine, which contains the SOF in a large amount, can be reduced and removed furthermore efficiently.

Therefore, when the present invention is employed in an exhaust-gas-purifying system of an automobile, the present invention can suppress the emission of the $NO_x$, and can suppress the air pollution resulting from automobile exhaust gases.

What is claimed is:

1. A catalyst for purifying an exhaust gas comprising: a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; and wherein loading amounts of said noble metal of an upstream portion disposed on an upstream side of an exhaust gas flow and of a downstream portion disposed on a downstream side are greater than a loading amount of an intermediate portion between the upstream portion and the downstream portion.

2. The catalyst for purifying an exhaust gas set forth in claim 1 characterized in that a strong acid is contained in at least said upstream portion of either one of said upstream portion and said downstream portion of said support.

3. A catalyst for purifying an exhaust gas comprising:
   a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; and wherein a strong acid is contained in an upstream portion disposed on an upstream side of said exhaust gas flow.

4. The catalyst for purifying an exhaust gas set forth in claim 3 characterized in that in said support, a zeolite content of said upstream portion is greater than that of a downstream portion.

5. The catalyst for purifying an exhaust gas set forth in claim 3 characterized in that a loading amount of the noble metal of said upstream portion is less than a loading amount of the noble metal of a downstream portion.

6. A catalyst for purifying an exhaust gas comprising:
   a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; and wherein said support comprises a strongly-acidified zeolite whose silicon-to-aluminum molar ratio (Si/Al) is 150 or more, a porous support and an oxygen releasing material; and said noble metal is loaded on at least one of the porous support and the oxygen releasing material.

7. The catalyst for purifying an exhaust gas set forth in claim 6 characterized in that said zeolite has a coating layer comprising at least one member selected from the group consisting of titania, silica and zirconia; and the coating layer is strongly-acidified.

8. The catalyst for purifying an exhaust gas set forth in claim 6 characterized in that said oxygen releasing material comprises a ceria-zirconia composite oxide whose Zr/Ce molar ratio is 1 or less; and has a coating layer comprising at least one member selected from the group consisting of titania, silica and zirconia.

9. The catalyst for purifying an exhaust gas set forth in claim 8 characterized in that said coating layer is strongly-acidified.

10. The catalyst for purifying an exhaust gas set forth in claim 9 characterized in that said porous support is at least one member which is selected from those provided with at least one coating selected from the group consisting of titania, silica, zirconia and alumina, and which is strongly-acidified.

11. A catalyst for purifying an exhaust gas comprising:
    a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; and wherein said support comprises a zeolite whose silicon-to-aluminum molar ratio (Si/Al) is 150 or more and a strongly-acidified oxide layer which is coated on a surface of the zeolite, which includes at least one member selected from the group consisting of titania, zirconia and silica, and which is strongly acidified by an acid treatment.

12. A catalyst for purifying an exhaust gas comprising:
    a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; and wherein at least one $NO_x$ oxidizing agent selected from the group consisting of Ir, Pd, Rh, In, Mn and Fe is loaded on said support.

13. A catalyst for purifying an exhaust gas comprising:
    a support which contains an HC adsorbing material including a zeolite selected from the group consisting of mordenite, ZSM-5 and type Y zeolite and having a hydrocarbon adsorbing ability, and a noble metal and a solid strong acid which are loaded on the support, wherein the catalyst reduces and purifies nitrogen oxides in an exhaust gas in an oxygen-rich atmosphere; wherein said catalyst further comprises an oxygen releasing material and an $NO_x$ adsorbing material.

* * * * *